(12) United States Patent
Van Bommel et al.

(10) Patent No.: US 10,544,911 B2
(45) Date of Patent: Jan. 28, 2020

(54) MULTIPLE PUMPING LUMINESCENT ROD CONFIGURATION FOR OBTAINING ULTRA-HIGH BRIGHTNESS

(71) Applicant: SIGNIFY HOLDING B.V., Eindhoven (NL)

(72) Inventors: Ties Van Bommel, Eindhoven (NL); Rifat Ata Mustafa Hikmet, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/062,314

(22) PCT Filed: Dec. 6, 2016

(86) PCT No.: PCT/EP2016/079899
§ 371 (c)(1),
(2) Date: Jun. 14, 2018

(87) PCT Pub. No.: WO2017/102439
PCT Pub. Date: Jun. 22, 2017

(65) Prior Publication Data
US 2018/0372280 A1    Dec. 27, 2018

(30) Foreign Application Priority Data

Dec. 15, 2015 (EP) .................................... 15200113
Jun. 21, 2016 (EP) .................................... 16175412

(51) Int. Cl.
*F21K 9/00* (2016.01)
*F21K 9/64* (2016.01)
(Continued)

(52) U.S. Cl.
CPC .................. *F21K 9/64* (2016.08); *F21K 9/61* (2016.08); *F21K 9/65* (2016.08); *F21K 9/68* (2016.08);
(Continued)

(58) Field of Classification Search
CPC ..... F21V 9/30; F21V 9/32; F21V 9/35; F21V 9/38; F21V 9/08; F21K 9/61; F21K 9/64
See application file for complete search history.

(56) References Cited

U.S. PATENT DOCUMENTS

| 2009/0078949 | A1* | 3/2009 | Bechtel ..................... F21K 9/61 257/98 |
| 2014/0117253 | A1* | 5/2014 | Edwards .................. F21S 11/00 250/458.1 |

(Continued)

FOREIGN PATENT DOCUMENTS

| CN | 103199429 A | 7/2013 |
| CN | 104466644 A | 3/2015 |

(Continued)

*Primary Examiner* — Gerald J Sufleta, II
(74) *Attorney, Agent, or Firm* — Akarsh P. Belagodu

(57) ABSTRACT

The invention provides multiple primary transparent luminescent light guides pumped with LEDs for pumping a secondary single transparent luminescent light guide from its sides for getting high light intensity from its light exit surface. Especially, the absorption and emission wavelength from the primary transparent light guides need to be lower than that of the secondary transparent luminescent light guide.

14 Claims, 11 Drawing Sheets

(51) Int. Cl.
*F21V 8/00* (2006.01)
*F21K 9/61* (2016.01)
*F21K 9/65* (2016.01)
*F21K 9/68* (2016.01)

(52) U.S. Cl.
CPC ......... *G02B 6/0026* (2013.01); *G02B 6/0031* (2013.01); *G02B 6/0055* (2013.01); *G02B 6/0068* (2013.01)

(56) References Cited

U.S. PATENT DOCUMENTS

| | | | | |
|---|---|---|---|---|
| 2014/0218893 | A1* | 8/2014 | Tamura | G02B 6/0008 362/84 |
| 2014/0307466 | A1* | 10/2014 | Hikmet | G02B 6/005 362/607 |
| 2016/0025916 | A1* | 1/2016 | Tyagi | G02B 6/001 362/583 |
| 2016/0026076 | A1* | 1/2016 | Hu | G03B 21/204 353/84 |
| 2016/0104820 | A1* | 4/2016 | Lim | H01L 33/504 257/98 |

FOREIGN PATENT DOCUMENTS

| | | |
|---|---|---|
| EP | 2947484 A1 | 11/2015 |
| WO | WO2006054203 A1 | 5/2006 |
| WO | WO2014033576 A1 | 3/2014 |
| WO | WO2015058979 A1 | 4/2015 |
| WO | WO2015074867 A1 | 5/2015 |
| WO | WO2015173026 A2 | 11/2015 |
| WO | WO2015185469 A1 | 12/2015 |

* cited by examiner

MULTIPLE PUMPING LUMINESCENT ROD CONFIGURATION FOR OBTAINING ULTRA-HIGH BRIGHTNESS

CROSS-REFERENCE TO PRIOR APPLICATIONS

This application is the U.S. National Phase application under 35 U.S.C. § 371 of International Application No. PCT/EP2016/079899, filed on Dec. 6, 2016, which claims the benefit of European Patent Applications Nos. 16175412.2, filed on Jun. 21, 2016, and 15200113.7, filed on Dec. 15, 2015. These applications are hereby incorporated by reference herein.

FIELD OF THE INVENTION

The invention relates to a lighting device, such as for use in a projector, or in automotive lighting or stage lighting.

BACKGROUND OF THE INVENTION

Luminescent rods are known in the art. WO2006/054203, for instance, describes a light emitting device comprising at least one LED which emits light in the wavelength range of >220 nm to <550 nm and at least one conversion structure placed towards the at least one LED without optical contact, which converts at least partly the light from the at least one LED to light in the wavelength range of >300 nm to ≤1000 nm, characterized in that the at least one conversion structure has a refractive index n of >1.5 and <3 and the ratio A:E is >2:1 and <50000:1, where A and E are defined as follows: the at least one conversion structure comprises at least one entrance surface, where light emitted by the at least one LED can enter the conversion structure and at least one exit surface, where light can exit the at least one conversion structure, each of the at least one entrance surfaces having an entrance surface area, the entrance surface area(s) being numbered $A_1 \ldots A_n$ and each of the at least one exit surface(s) having an exit surface area, the exit surface area(s) being numbered $E_1 \ldots E_n$ and the sum of each of the at least one entrance surface(s) area(s) A being $A=A_1+A_2 \ldots +A_n$ and the sum of each of the at least one exit surface(s) area(s) E being $E=E_1+E_2 \ldots +E_n$.

SUMMARY OF THE INVENTION

High brightness light sources are interesting for various applications including spots, stage-lighting, headlamps and digital light projection, etc. For this purpose, it is possible to make use of so-called light concentrators where shorter wavelength light is converted to longer wavelengths in a highly transparent luminescent material. A rod of such a transparent luminescent material can be illuminated by LEDs to produce longer wavelengths within the rod. Converted light which will stay in the luminescent material, such as a doped garnet, in the waveguide mode and can then be extracted from one of the surfaces leading to an intensity gain.

One of the problems of this concept is related to the intensity of the LEDs used for pumping the luminescent waveguide. For this purpose, longer waveguides with more LEDs can be used. However, this may make the rod relatively long and more difficult to produce. This makes scalability for obtaining higher intensities relatively difficult.

Hence, it is an aspect of the invention to provide an alternative lighting device, which preferably further at least partly obviates one or more of above-described drawbacks, and which may have a relatively good efficiency and a high intensity, and which may also be scalable.

For this purpose, we herein suggest using multiple primary transparent luminescent light guides pumped with LEDs for pumping a secondary single transparent luminescent light guide from its sides for getting high light intensity from its light exit surface. Especially, the absorption and emission wavelength from the primary transparent light guides need to be lower than that of the secondary transparent luminescent light guide.

In a first aspect, the invention provides a lighting device comprising:

a plurality of luminescent concentrators, each luminescent concentrator comprising an elongated light transmissive body having a first face and a second face wherein the distance between the first face and the second face defines a length (L) of the elongated body, the elongated body comprising one or more radiation input faces extending between the first face and the second face, and a radiation exit window, wherein the second face comprises said radiation exit window; each elongated light transmissive body comprising a luminescent material configured to convert at least part of a pump radiation received at one or more radiation input faces into luminescent material light, and each luminescent concentrator configured to couple at least part of the luminescent material light out at the radiation exit window as converter light, a plurality of light sources configured to provide light source light as first pump radiation to the radiation input faces of a plurality of first luminescent concentrators;

said plurality of first luminescent concentrators configured to provide first luminescent material light at the respective radiation exit windows of the first luminescent concentrators as first converter light (herein also indicated as "first concentrator light"), and configured to provide said first converter light as second pump radiation to one or more radiation input faces of a second luminescent concentrator; and said second luminescent concentrator, configured to provide second luminescent material light at the radiation exit window of the second luminescent concentrator as second converter light (herein also indicated as "second concentrator light").

Hence, the invention uses instead of a single large light concentrator a plurality of (smaller) light concentrators as light sources to pump a single light concentrator. This principle may be used in a configuration with a concentrator-concentrator functional coupling, in a concentrator-concentrator-concentration functional coupling, and optionally even further cascades may be possible. The first concentrators especially provides Stokes-shifted light which is used to pump the second concentrator, and optionally the second concentrator(s) may again be used to pump a third concentrator. In this way reabsorption losses may be minimized and scalability is introduced. Further, the final light intensity can be much higher than with a single large light concentrator, as e.g. highly optimized concentrators can be used to pump the downstream concentrator instead of light sources.

Hence, (high intensity) solid state light sources may be used to pump first concentrators to provide (highly efficient) first concentrators, and these may again be used to pump a second concentrator. The term "light concentrator" is herein used, as a plurality of light sources irradiate a relative large surface (area) of the light converter, and a lot of converter light escapes from a relatively small area (exit window) of the light converter. Thereby, the specific configuration of the light converter provides its light concentrator properties. The lighting device provides lighting device light which includes light of the light concentrator(s) configured most downstream, which may in embodiments be the second concentrator. Further, a lighting device may comprise a plurality of second and/or third concentrators. Each light concentrator may provide Stokes-shifted light, which is Stokes shifted relative to the pump radiation.

The terms "upstream" and "downstream" relate to an arrangement of items or features relative to the propagation of the light from a light generating means (here the especially the light source(s)), wherein relative to a first position within a beam of light from the light generating means, a second position in the beam of light closer to the light generating means is "upstream", and a third position within the beam of light further away from the light generating means is "downstream". The second light concentrator is configured downstream from the first light concentrator, and the light sources are configured upstream from the first light concentrator (and effectively also configured upstream from the second light concentrator).

In the present invention, at least two types of light concentrators are applied: those that are pumped by the light sources, especially solid state light sources, which are indicated as first light concentrators, and the one that is pumped by the first light concentrators, and which is indicated as second light concentrator. Optionally, there may be a plurality of first light concentrators second light concentrator combinations, which can be used to pump a third light concentrator. Though in principle each light concentrator within the plurality of first light concentrators may be different, though one or more light concentrators and the second light concentrator(s) may be different, etc . . . , there are some general aspects that may apply to all light concentrators. These are herein elucidated below.

Each light concentrators comprises a light transmissive body. The light concentrators are especially described in relation to an elongated light transmissive body, such as a ceramic rod. However, these aspects may also be relevant for other shaped ceramic bodies.

The light transmissive body has light guiding or wave guiding properties. Hence, the light transmissive body is herein also indicated as waveguide or light guide. As the light transmissive body is used as light concentrator, the light transmissive body is herein also indicated as light concentrator. The light transmissive body will in general have (some) transmission of visible light in a direction perpendicular to the length of the light transmissive body. Without the activator such as trivalent cerium, the transmission in the visible might be close to 100%.

Herein, the term "visible light" especially relates to light having a wavelength selected from the range of 380-780 nm. The transmission can be determined by providing light at a specific wavelength with a first intensity to the light transmissive body under perpendicular radiation and relating the intensity of the light at that wavelength measured after transmission through the material, to the first intensity of the light provided at that specific wavelength to the material (see also E-208 and E-406 of the CRC Handbook of Chemistry and Physics, 69th edition, 1088-1989).

The light transmissive body may have any shape, such as beam like or rod like, however especially beam like (cuboid like). However, the light transmissive body may also be disk like, etc. The invention is not limited to specific embodiments of shapes, neither is the invention limited to embodiments with a single exit window or outcoupling face. Below, some specific embodiments are described in more detail.

Would the light transmissive body have a circular cross-section, then the width and height may be equal (and may be defined as diameter). Especially, however, the light transmissive body has a cuboid like shape and is further configured to provide a single exit window.

In a specific embodiment, the light transmissive body may especially have an aspect ratio larger than 1, i.e. the length is larger than the width. In general, the light transmissive body is a rod or bar (beam), though the light transmissive body does not necessarily have a square, rectangular or round cross-section. In general, the light source is configured to irradiate one of the longer faces (side edge), herein indicated as radiation input face, and radiation escapes from a face at a front (front edge), herein indicated as radiation exit window. Especially, in embodiments the solid state light source, or other light source, is not in physical contact with the light transmissive body. Physical contact may lead to undesired outcoupling and thus a reduction in concentrator efficiency. Further, in general the light transmissive body comprises two substantially parallel faces, the radiation input face and opposite thereof the opposite face. These two faces define herein the width of the light transmissive body. In general, the length of these faces defines the length of the light transmissive body. However, as indicated above, and also below, the light transmissive body may have any shape, and may also include combinations of shapes. Especially, the radiation input face has an radiation input face area (A), wherein the radiation exit window has a radiation exit window area (E), and wherein the radiation input face area (A) is at least 1.5 times, even more especially at least two times larger than the radiation exit window area (E), especially at least 5 times larger, such as in the range of 2-50,000, especially 5-5,000 times larger. Hence, especially the elongated light transmissive body comprises a geometrical concentration factor, defined as the ratio of the area of the radiation input faces and the area of the radiation exit window, of at least 1.5, such as at least 2, like at least 5, or much larger (see above). This allows e.g. the use of a plurality of solid state light sources (see also below). For typical applications like in automotive or digital projectors, a small but high intense emissive surface is desired. This cannot be obtained with a single LED, but can be obtained with the present lighting device. Especially, the radiation exit window has a radiation exit window area (E) selected from the range of 1-100 mm$^2$. With such dimensions, the emissive surface can be small, whereas nevertheless high intensity may be achieved. As indicated above, the light transmissive body in general has an aspect ratio (of length/width). This allows a small radiation exit surface, but a large radiation input surface, e.g. irradiated with a plurality of solid state light sources. In a specific embodiment, the light transmissive body has a width (W) selected from the range of 0.5-100 mm. The light transmissive body is thus especially an integral body, having the herein indicated faces.

The generally rod shaped or bar shaped light transmissive body can have any cross sectional shape, but in embodiments has a cross section the shape of a square, rectangle, round, oval, triangle, pentagon, or hexagon. Generally the ceramic bodies are cuboid, but may be provided with a different shape than a cuboid, with the light input surface having somewhat the shape of a trapezoid. By doing so, the light flux may be even enhanced, which may be advantageous for some applications. Hence, in some instances (see also above) the term "width" may also refer to diameter, such as in the case of a light transmissive body having a round cross section. Hence, in embodiments the elongated light transmissive body further has a width (W) and a height (H), with especially L>W and L>H. Especially, the first face and the second face define the length, i.e. the distance between these faces is the length of the elongated light transmissive body. These faces may especially be arranged parallel. Further, in a specific embodiment the length (L) is at least 2 cm, such as 10-20 cm.

Especially, the light transmissive body has a width (W) selected to absorb more than 95% of the light source light. In embodiments, the light transmissive body has a width (W) selected from the range of 0.05-4 cm, especially 0.1-2 cm, such as 0.2-1.5 cm. With the herein indicated cerium concentration, such width is enough to absorb substantially all light generated by the light sources.

The light transmissive body may also be a cylindrically shaped rod. In embodiments the cylindrically shaped rod has one flattened surface along the longitudinal direction of the rod and at which the light sources may be positioned for efficient incoupling of light emitted by the light sources into the light transmissive body. The flattened surface may also be used for placing heat sinks The cylindrical light transmissive body may also have two flattened surfaces, for example located opposite to each other or positioned perpendicular to each other. In embodiments the flattened surface extends along a part of the longitudinal direction of the cylindrical rod. Especially however, the edges are planar and configured perpendicular to each other.

The light transmissive body as set forth below in embodiments according to the invention may also be folded, bended and/or shaped in the length direction such that the light transmissive body is not a straight, linear bar or rod, but may comprise, for example, a rounded corner in the form of a 90 or 180 degrees bend, a U-shape, a circular or elliptical shape, a loop or a 3-dimensional spiral shape having multiple loops. This provides for a compact light transmissive body of which the total length, along which generally the light is guided, is relatively large, leading to a relatively high lumen output, but can at the same time be arranged into a relatively small space. For example luminescent parts of the light transmissive body may be rigid while transparent parts of the light transmissive body are flexible to provide for the shaping of the light transmissive body along its length direction. The light sources may be placed anywhere along the length of the folded, bended and/or shaped light transmissive body.

Parts of the light transmissive body that are not used as light incoupling area or light exit window may be provided with a reflector. Hence, in an embodiment the lighting device further comprises a reflector configured to reflect luminescent material light back into the light transmissive body. Therefore, the lighting device may further include one or more reflectors, especially configured to reflect radiation back into the light transmissive body that escapes from one or more other faces than the radiation exit window. Especially, a face opposite of the radiation exit window may include such reflector, though in an embodiment not in physical contact therewith. Hence, the reflectors may especially not be in physical contact with the light transmissive body. Therefore, in an embodiment the lighting device further comprises an optical reflector (at least) configured downstream of the first face and configured to reflect light back into the elongated light transmissive body. Alternatively or additionally, optical reflectors may also be arranged at other faces and/or parts of faces that are not used to couple light source light in or luminescence light out. Especially, such optical reflectors may not be in physical contact with the light transmissive body. Further, such optical reflector(s) may be configured to reflect one or more of the luminescence and light source light back into the light transmissive body. Hence, substantially all light source light may be reserved for conversion by the luminescent material (i.e. the activator element(s) such as especially $Ce^{3+}$) and a substantial part of the luminescence may be reserved for outcoupling from the radiation exit window. The term "reflector" may also refer to a plurality of reflectors.

The terms "coupling in" and similar terms and "coupling out" and similar terms indicate that light changes from medium (external from the light transmissive body into the light transmissive body, and vice versa, respectively). In general, the light exit window will be a face (or a part of a face), configured (substantially) perpendicular to one or more other faces of the waveguide. In general, the light transmissive body will include one or more body axes (such as a length axis, a width axis or a height axis), with the exit window being configured (substantially) perpendicular to such axis. Hence, in general, the light input face(s) will be configured (substantially) perpendicular to the light exit window. Thus, the radiation exit window is especially configured perpendicular to the one or more radiation input faces. Therefore, especially the face comprising the light exit window does not comprise a light input face.

Downstream of the radiation exit window, optionally an optical filter may be arranged. Such optical filter may be used to remove undesired radiation. For instance, when the lighting device should provide red light, all light other than red may be removed. Hence, in a further embodiment the lighting device further comprises an optical filter configured downstream of the radiation exit window and configured to reduce the relative contribution of non-red light in the converter light (downstream of the radiation exit window). For filtering out light source light, optionally an interference filter may be applied. Likewise this may apply to another color, when a color other than green and red is desired.

In yet a further embodiment, the lighting device further comprises a collimator configured downstream of the radiation exit window (of the highest order luminescent concentrator) and configured to collimate the converter light. Such collimator, like e.g. a CPC (compound parabolic concentrator), may be used to collimate the light escaping from the radiation exit window and to provide a collimated beam of light.

Further, the lighting device may include a heat sink configured to facilitate cooling of the solid state light source and/or luminescent concentrator. The heat sink may comprise or consist of copper, aluminum, silver, gold, silicon carbide, aluminum nitride, boron nitride, aluminum silicon carbide, beryllium oxide, silicon-silicon carbide, aluminum silicon carbide, copper tungsten alloys, copper molybdenum carbides, carbon, diamond, graphite, and combinations of two or more thereof. The lighting device may further include one or more cooling elements configured to cool the light transmissive body.

Especially, the light sources are light sources that during operation emit (light source light) at least light at a wavelength selected from the range of 200-490 nm, especially light sources that during operation emit at least light at wavelength selected from the range of 400-490 nm, even more especially in the range of 440-490 nm. This light may partially be used by the luminescent material. Hence, in a specific embodiment, the light source is configured to generate blue light. In a specific embodiment, the light source comprises a solid state LED light source (such as a LED or laser diode). The term "light source" may also relate to a plurality of light sources, such as e.g. 2-100, such as 2-20 (solid state) LED light sources, though many more light sources may be applied. Hence, the term LED may also refer to a plurality of LEDs. Hence, as indicated herein, the term "solid state light source" may also refer to a plurality of solid state light sources. In an embodiment (see also below), these are substantially identical solid state light sources, i.e. providing substantially identical spectral distributions of the solid state light source radiation. In embodiments, the solid state light sources may be configured to irradiate different faces of the light transmissive body.

The lighting device comprises a plurality of light sources. Especially, the light source light of the plurality of light sources have spectral overlap, even more especially, they are of the same type and provide substantial identical light (having thus substantial the same spectral distribution). Hence, the light sources may substantially have the same emission maximum ("peak maximum"), such as within a bandwidth of 10 nm, especially within 8 nm, such as within 5 nm (binning).

The light sources are especially configured to provide a blue optical power ($W_{opt}$) of at least 0.2 Watt/mm² to the light transmissive body, i.e. to the radiation input face(s). The blue optical power is defined as the energy that is within the energy range that is defined as blue part of the spectrum (see also below). Especially, the photon flux is in average at least $4.5*10^{17}$ photons/(s·mm²), such as at least $6.0*10^{17}$ photons/(s·mm²). Assuming blue (excitation) light, this may e.g. correspond to a blue power ($W_{opt}$) provided to at least one of the radiation input faces of in average at least 0.067 Watt/mm² and 0.2 Watt/mm², respectively. Here, the term "in average" especially indicates an average over the area (of the at least one of the radiation input surfaces). When more than one radiation input surface is irradiated, then especially each of these radiation input surfaces receives such photon flux. Further, especially the indicated photon flux (or blue power when blue light source light is applied) is also an average over time.

In yet a further embodiment, especially for projector applications, the plurality of light sources are operated in pulsed operation with a duty cycle selected from the range of 10-80%, such as 25-70%.

The lighting device comprises a plurality of luminescent concentrators, such as in the range of 2-50, like 3-20 light concentrators. Hence, in embodiments the lighting device comprises at least three luminescent concentrators, such as two first luminescent concentrators and a second luminescent concentrator.

Each first light concentrator may radiationally be coupled with one or more light sources, especially a plurality of light sources, such as 2-100, like 2-50 light sources. The term "radiationally coupled" especially means that the light source and the (first) light concentrator are associated with each other so that at least part of the radiation emitted by the light source is received by the first light concentrator (and at least partly converted into luminescence).

Likewise, the second light concentrator may radiationally be coupled with one or more first light concentrators, especially a plurality of first light concentrators, such as 2-100, like 2-50 first light concentrators. In embodiments wherein a third light concentrator is applied (see also below), the third light concentrator may radiationally be coupled with one or more second light concentrators, especially a plurality of second light concentrators, such as 2-100, like 2-50 second light concentrators. A further cascade to a fourth luminescent concentrator is not excluded, but will in general not be applied.

Hence, each luminescent concentrator receives at one or more radiation input faces radiation (pump radiation) from an upstream configured light concentrator or from upstream configured light sources. Further, each light concentrator comprises a luminescent material configured to convert at least part of a pump radiation received at one or more radiation input faces into luminescent material light, and each luminescent concentrator configured to couple at least part of the luminescent material light out at the radiation exit window as converter light. This converter light is used as pump radiation for a downstream configured concentrator or may be used as component of the lighting device light.

Therefore, a plurality of light sources, especially solid state light sources, are configured to provide light source light as first pump radiation to the radiation input faces of a plurality of first luminescent concentrators. In the first luminescent concentrators the pump radiation is converted and the concentrators generate first luminescent material light to provide this first luminescent material light downstream from the radiation exit window. The first luminescent material light is used as pump radiation for the second luminescent concentrators. Hence, said plurality of first luminescent concentrators, are configured to provide first luminescent material light at the respective radiation exit windows of the first luminescent concentrators as first converter light, and configured to provide said first converter light as second pump radiation to one or more radiation input faces of a second luminescent concentrator.

In the second luminescent concentrators the pump radiation is converted and the concentrators generate second luminescent material light to provide this light downstream from the radiation exit window, which is again used as pump radiation for the third luminescent concentrators (see below) or as component of the lighting device light (optionally after further optical processing). Hence, said second luminescent concentrator is configured to provide second luminescent material light at the radiation exit window of the second luminescent concentrator as second converter light.

The phrase "configured to provide luminescent material light at the radiation exit window" and similar phrases especially refers to embodiments wherein the luminescent material light is generated within the luminescent concentrator (i.e. within the light transmissive body), and part of the luminescent material light will reach the radiation exit window and escape from the luminescent concentrator. Hence, downstream of the radiation exit window the luminescent material light is provided. The converter light, downstream of the radiation exit window comprises at least the luminescent material light escaped via the radiation exit window from the light converter. Instead of the term "converter light" also the term "light concentrator light" may be used. Pump radiation can be applied to a single radiation input face or a plurality of radiation input faces. Hence, in an embodiment the plurality of first luminescent concentrators are configured to provide said first converter light as second pump radiation to a single radiation input faces of the second luminescent concentrator. In yet further embodiments, the plurality of first luminescent concentrators are configured to provide said first converter light as second pump radiation to two or more radiation input faces of the second luminescent concentrator.

Likewise, this may apply to the pump radiation of the light sources applied to one or more radiation input faces of the (concomitant) first luminescent concentrator. When a third luminescent concentrator is applied, also the pump radiation (from the second light concentrators) may be applied to a single radiation input face or a plurality of radiation input faces (of the third luminescent concentrator).

Note that above indicated dimensions like length, ratio, etc., may thus differ for each light concentrator, though in embodiments the first light concentrators may all be substantially identical. Hence, in embodiments the plurality of first luminescent concentrators includes two or more subsets of first luminescent concentrators having different lengths (L). In yet further embodiments, the plurality of first luminescent concentrators all substantially have identical lengths (L).

In embodiments, the length (L) is selected from the range of 5-50 cm. This may thus apply to all luminescent concentrators. However, the range indicates that the different luminescent concentrators may have different lengths within this range.

The first luminescent concentrators may be configured perpendicular to the second luminescent concentrators. Likewise, when applicable, the second luminescent concentrators may be configured perpendicular to the third luminescent concentrators.

However, when desired the luminescent concentrators that are used as pumps may also be configured under a non-perpendicular angle. Especially, each luminescent concentrator comprises a body axis (BA). Hence, in embodiments the plurality of first luminescent concentrators includes two or more subsets of first luminescent concentrators configured with an angle of the body axis (BA) of the first luminescent concentrator and the body axis (BA) of the second luminescent concentrator unequal to 90°, such as in the range of at least 5° to smaller than 90°, such as 15-45°. Angles unequal to 90° may especially be useful for low surface reflection.

In yet further embodiments, the elongated light transmissive body of one or more luminescent concentrators comprise an elongated ceramic body. For instance, luminescent ceramic garnets doped with $Ce^{3+}$ (trivalent cerium) can be used to convert blue light into light with a longer wavelength, e.g. within the green to red wavelength region, such as in the range of about 500-750 nm. To obtain sufficient absorption and light output in desired directions, it is advantageous to use transparent rods (especially substantially shaped as beams). Such rod can be used as light concentrator, concentrating over their length light source light from light sources such as LEDs (light emitting diodes), converting this light source light into converter light and providing at an exit surface a substantial amount of converter light. Lighting devices based on light concentrators may e.g. be of interest for projector applications. For projectors, red and green luminescent concentrators are of interest. Green luminescent rods, based on garnets, can be relatively efficient. Such concentrators are especially based on YAG:Ce (i.e. $Y_3Al_5O_{12}:Ce^{3+}$) or LuAG ($Lu_3Al_5O_{12}:Ce^{3+}$). 'Red' garnets can be made by doping a YAG-garnet with Gd ("YGdAG"). Doping of Gd, however, results in a lower thermal stability (thermal quenching). Red-shifting can also be obtained using a high Ce concentration, with a much smaller penalty for thermal stability.

Hence, especially the elongated light transmissive body comprises a ceramic material configured to wavelength convert at least part of the (blue) light source light into converter light in the red, which converter light at least partly escapes from the radiation exit window. The ceramic material especially comprises an $A_3B_5O_{12}:Ce^{3+}$ ceramic material ("ceramic garnet"), wherein A comprises yttrium (Y) and gadolinium (Gd), and wherein B comprises aluminum (Al). As further indicated below, A may also refer to other rare earth elements and B may include Al only, but may optionally also include gallium. The formula $A_3B_5O_{12}:$ $Ce^{3+}$ especially indicates the chemical formula, i.e. the stoichiometry of the different type of elements A, B and O (3:5:12). However, as known in the art the compounds indicated by such formula may optionally also include a small deviation from stoichiometry.

In yet a further aspect, the invention also provides such elongated light transmissive body per se, i.e. an elongated light transmissive body having a first face and a second face, these faces especially defining the length (L) of the elongated light transmissive body, the elongated light transmissive body comprising one or more radiation input faces and a radiation exit window, wherein the second face comprises said radiation exit window, wherein the elongated light transmissive body comprises a ceramic material configured to wavelength convert at least part of (blue) light source light into converter light, such as (at least) red converter light (which at least partly escapes from the radiation exit window when the elongated light transmissive body is irradiated with blue light source light), wherein the ceramic material comprises an $A_3B_5O_{12}:Ce^{3+}$ ceramic material as defined herein. Such light transmissive body can thus be used as light converter. Especially, such light transmissive body has the shape of a cuboid.

As indicated above, the ceramic material comprises a garnet material. Hence, the elongated body especially comprises a luminescent ceramic. The garnet material, especially the ceramic garnet material, is herein also indicated as "luminescent material". The luminescent material comprises an $A_3B_5O_{12}:Ce^{3+}$ (garnet material), wherein A is especially selected from the group consisting of Sc, Y, Tb, Gd, and Lu (especially at least Y and Gd), wherein B is especially selected from the group consisting of Al and Ga (especially at least Al). More especially, A (essentially) comprises yttrium (Y) and gadolinium (Gd), and B (essentially) comprises aluminum (Al). Such garnet is be doped with cerium (Ce), and optionally with other luminescent species such as praseodymium (Pr).

As indicated above, the element A may especially be selected from the group consisting of yttrium (Y) and gadolinium (Gd). Hence, $A_3B_5O_{12}:Ce^{3+}$ especially refers to $(Y_{1-x}Gd_x)_3B_5O_{12}:Ce^{3+}$, wherein especially x is in the range of 0.1-0.5, even more especially in the range of 0.2-0.4, yet even more especially 0.2-0.35. Hence, A may comprise in the range of 50-90 atom % Y, even more especially at least 60-80 atom % Y, yet even more especially 65-80 atom % of A comprises Y. Further, A comprises thus especially at least 10 atom % Gd, such as in the range of 10-50 atom % Gd, like 20-40 atom %, yet even more especially 20-35 atom % Gd.

Especially, B comprises aluminum (Al), however, B may also partly comprise gallium (Ga) and/or scandium (Sc) and/or indium (In), especially up to about 20% of Al, more especially up to about 10% of Al may be replaced (i.e. the A ions essentially consist of 90 or more mole % of Al and 10 or less mole % of one or more of Ga, Sc and In); B may especially comprise up to about 10% gallium. Therefore, B may comprise at least 90 atom % Al. Hence, $A_3B_5O_{12}:Ce^{3+}$ especially refers to $(Y_{1-x}Gd_x)_3Al_5O_{12}:Ce^{3+}$, wherein especially x is in the range of 0.1-0.5, even more especially in the range of 0.2-0.4.

In another variant, B (especially Al) and O may at least partly be replaced by Si and N. Optionally, up to about 20% of Al—O may be replaced by Si—N, such as up to 10%.

For the concentration of cerium, the indication n mole % Ce indicates that n % of A is replaced by cerium. Hence, $A_3B_5O_{12}:Ce^{3+}$ may also be defined as $(A_{1-n}Ce_n)_3B_5O_{12}$, with n being in the range of 0.005-0.035. Therefore, a garnet essentially comprising Y and mole Ce may in fact refer to $((Y_{1-x}Gd_x)_{1-n}Ce_n)_3B_5O_{12}$, with x and n as defined above.

Especially, the ceramic material is obtainable by a sintering process and/or a hot pressing process, optionally followed by an annealing in an (slightly) oxidizing atmosphere. The term "ceramic" especially relates to an inorganic material that is—amongst others—obtainable by heating a (poly crystalline) powder at a temperature of at least 500° C., especially at least 800° C., such as at least 1000° C., like at least 1400° C., under reduced pressure, atmospheric pressure or high pressure, such as in the range of $10^{-8}$ to 500 MPa, such as especially at least 0.5 MPa, like especially at least 1 MPa, like 1 to about 500 MPa, such as at least 5 MPa, or at least 10 MPa, especially under uniaxial or isostatic pressure, especially under isostatic pressure. A specific method to obtain a ceramic is hot isostatic pressing (HIP), whereas the HIP process may be a post-sinter HIP, capsule HIP or combined sinter-HIP process, like under the temperature and pressure conditions as indicate above. The ceramic obtainable by such method may be used as such, or may be further processed (like polishing). A ceramic especially has density that is at least 90% (or higher, see below), such as at least 95%, like in the range of 97-100%, of the theoretical density (i.e. the density of a single crystal). A ceramic may still be polycrystalline, but with a reduced, or strongly reduced volume between grains (pressed particles or pressed agglomerate particles). The heating under elevated pressure, such as HIP, may e.g. be performed in an inert gas, such as comprising one or more of $N_2$ and argon (Ar). Especially, the heating under elevated pressures is preceded by a sintering process at a temperature selected from the range of 1400-1900° C., such as 1500-1800° C. Such sintering may be performed under reduced pressure, such as at a pressure of $10^{-2}$ Pa or lower. Such sintering may already lead to a density of in the order of at least 95%, even more especially at least 99%, of the theoretical density. After both the pre-sintering and the heating, especially under elevated pressure, such as HIP, the density of the light transmissive body can be close to the density of a single crystal. However, a difference is that grain boundaries are available in the light transmissive body, as the light transmissive body is polycrystalline. Such grain boundaries can e.g. be detected by optical microscopy or SEM. Hence, herein the light transmissive body especially refers to a sintered polycrystalline having a density substantially identical to a single crystal (of the same material). Such body may thus be highly transparent for visible light (except for the absorption by the light absorbing species such as especially $Ce^{3+}$).

After obtaining the light transmissive body, the body may be polished. Before or after polishing an annealing process (in an oxidative atmosphere) may be executed, especially before polishing. In a further specific embodiment, said annealing process lasts for at least 2 hours, such as at least 2 hours at at least 1200° C. Further, especially the oxidizing atmosphere comprises for example $O_2$.

Instead of cerium doped garnets, or in addition to such garnets, also other luminescent materials may be applied, e.g. embedded in organic or inorganic light transmissive matrixes, as luminescent concentrator. For instance quantum dots and/or organic dyes may be applied and may be embedded in transmissive matrices like e.g. polymers, like PMMA, or polysiloxanes, etc. etc.

Quantum dots are small crystals of semiconducting material generally having a width or diameter of only a few nanometers. When excited by incident light, a quantum dot emits light of a color determined by the size and material of the crystal. Light of a particular color can therefore be produced by adapting the size of the dots. Most known quantum dots with emission in the visible range are based on cadmium selenide (CdSe) with a shell such as cadmium sulfide (CdS) and zinc sulfide (ZnS). Cadmium free quantum dots such as indium phosphode (InP), and copper indium sulfide ($CuInS_2$) and/or silver indium sulfide ($AgInS_2$) can also be used. Quantum dots show very narrow emission band and thus they show saturated colors. Furthermore the emission color can easily be tuned by adapting the size of the quantum dots. Any type of quantum dot known in the art may be used in the present invention. However, it may be preferred for reasons of environmental safety and concern to use cadmium-free quantum dots or at least quantum dots having a very low cadmium content.

Organic phosphors can be used as well. Examples of suitable organic phosphor materials are organic luminescent materials based on perylene derivatives, for example compounds sold under the name Lumogen® by BASF. Examples of suitable compounds include, but are not limited to, Lumogen® Red F305, Lumogen® Orange F240, Lumogen® Yellow F083, and Lumogen® F170.

Several color conversion schemes may be possible. Especially, however, the Stokes shift is relatively small. Especially, the Stokes shift, defined as the difference (in wavelength) between positions of the band maxima of the light source used for pumping and the light which is emitted, is not larger than 100 nm; especially however, the Stokes shift is at least about 10 nm, such as at least about 20 nm. This may especially apply to the light source light to first luminescent material light conversion, but also apply to the second pump radiation to second luminescent material light conversion, etc.

In embodiments, the plurality of light sources are configured to provide UV radiation as first pump radiation, and the first luminescent concentrators are configured to provide one or more of blue and green first converter light. In yet other embodiments, the plurality of light sources are configured to provide blue radiation as first pump radiation, and the first luminescent concentrators are configured to provide one or more of green and yellow first converter light. Note, as also indicated below, such embodiments may also be combined.

Especially, the second luminescent concentrator is configured to provide one or more of yellow, orange and red second converter light. Note that in embodiments a plurality of different second luminescent concentrators may be applied, to provide e.g. yellow and red converter light, respectively.

As indicated above, the lighting device may further comprise such third luminescent concentrator. Hence, in embodiments of the lighting device said plurality of first luminescent concentrators are configured to provide said first converter light as second pump radiation to one or more radiation input faces of a plurality of second luminescent concentrator; said second luminescent concentrators are configured to provide second luminescent material light at the radiation exit windows of the second luminescent concentrators as second converter light, and configured to provide said second converter light as third pump radiation to one or more radiation input faces of a third second luminescent concentrator; and said third luminescent concentrator, configured to provide third luminescent material light (herein also indicated as "third concentrator light") at the radiation exit window of the third luminescent concentrator as third converter light. Especially, in embodiments the third luminescent concentrator is configured to provide one or more of yellow, orange and red third converter light.

The light provided by the second luminescent concentrator or optional third luminescent concentrator may be applied to provide lighting device light. The lighting device may comprise one or more different second luminescent concentrators and/or one or more different third luminescent concentrators, and optionally other light sources, including even solid state light sources that provide directly light and/or first luminescent concentrators that provide directly light. Further, the lighting device may include optics, including filters, to further optically process one or more of the light source light, the first converter light, the second converter light, etc. etc.

In embodiments, the lighting device is configured to provide lighting device light at least including the second converter light. In yet other embodiments, the lighting device is configured to provide lighting device light at least including the third converter light (when third light converters are included in the lighting device.

The lighting device may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, green house lighting systems, horticulture lighting, or LCD backlighting, etc.

In yet a further aspect, the invention provides a projector comprising the lighting device as defined herein. As indicated above, of course the light projector may also include a plurality of such lighting devices.

In yet a further aspect, the invention also provides a lighting system configured to provide lighting system light, the lighting system comprising one or more lighting devices as defined herein and optionally one or more second lighting devices configured to provide second lighting device light, wherein the lighting system light comprises (a) one or more of (i) said second converter light as defined herein and (ii) said third converter light as defined herein, and optionally (b) second lighting device light. Hence, the invention also provides a lighting system configured to provide visible light, wherein the lighting system comprises at least one lighting device as defined herein. For instance, such lighting system may also comprise one or more (additional) optical elements, like one or more of optical filters, collimators, reflectors, wavelength converters, etc. The lighting system may be, for example, a lighting system for use in an automotive application, like a headlight. Hence, the invention also provides an automotive lighting system configured to provide visible light, wherein the automotive lighting system comprises at least one lighting device as defined herein and/or a digital projector system comprising at least one lighting device as defined herein. Especially, the lighting device may be configured (in such applications) to provide red light. The automotive lighting system or digital projector system may also comprise a plurality of the lighting devices as described herein.

The term white light herein, is known to the person skilled in the art. It especially relates to light having a correlated color temperature (CCT) between about 2000 and 20000 K, especially 2700-20000 K, for general lighting especially in the range of about 2700 K and 6500 K, and for backlighting purposes especially in the range of about 7000 K and 20000 K, and especially within about 15 SDCM (standard deviation of color matching) from the BBL (black body locus), especially within about 10 SDCM from the BBL, even more especially within about 5 SDCM from the BBL.

The terms "violet light" or "violet emission" especially relates to light having a wavelength in the range of about 380-440 nm. The terms "blue light" or "blue emission" especially relates to light having a wavelength in the range of about 440-490 nm (including some violet and cyan hues). The terms "green light" or "green emission" especially relate to light having a wavelength in the range of about 490-560 nm. The terms "yellow light" or "yellow emission" especially relate to light having a wavelength in the range of about 560-570 nm. The terms "orange light" or "orange emission" especially relate to light having a wavelength in the range of about 570-600. The terms "red light" or "red emission" especially relate to light having a wavelength in the range of about 600-780 nm. The term "pink light" or "pink emission" refers to light having a blue and a red component. The terms "visible", "visible light" or "visible emission" refer to light having a wavelength in the range of about 380-780 nm.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily on scale.

DETAILED DESCRIPTION OF THE EMBODIMENTS

A light emitting device according to the invention may be used in applications including but not being limited to a lamp, a light module, a luminaire, a spot light, a flash light, a projector, a (digital) projection device, automotive lighting such as e.g. a headlight or a taillight of a motor vehicle, arena lighting, theater lighting and architectural lighting.

Light sources which are part of the embodiments according to the invention as set forth below, may be adapted for, in operation, emitting light with a first spectral distribution. This light is subsequently coupled into a light guide or waveguide; here the light transmissive body. The light guide or waveguide may convert the light of the first spectral distribution to another spectral distribution and guides the light to an exit surface.

Figure 1A:
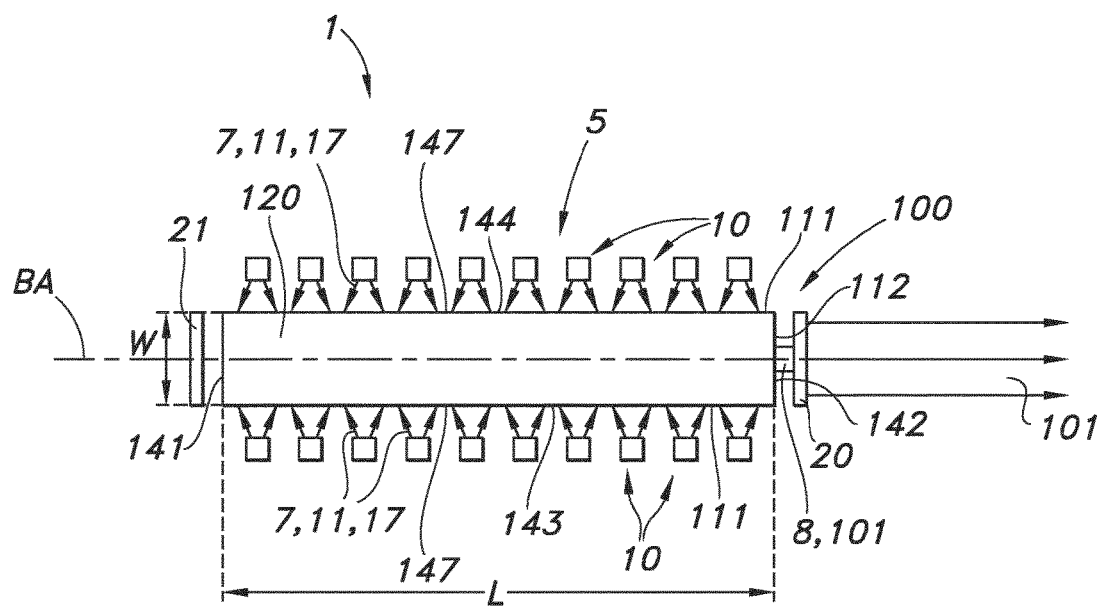
FIGS. 1a-1d schematically depict some aspects of the invention.

An embodiment of the lighting device as defined herein is schematically depicted in FIG. 1a. FIG. 1a schematically depicts a lighting device 1 comprising a plurality of solid state light sources 10 and a luminescent concentrator 5 comprising an elongated light transmissive body 100 having a first face 141 and a second face 142 defining a length L of the elongated light transmissive body 100. The elongated light transmissive body 100 comprising one or more radiation input faces 111, here by way of example two oppositely arranged faces, indicated with references 143 and 144 (which define e.g. the width W), which are herein also indicated as edge faces or edge sides 147. Further the light transmissive body 100 comprises a radiation exit window 112, wherein the second face 142 comprises said radiation exit window 112. The entire second face 142 may be used or configured as radiation exit window. The plurality of solid state light sources 10 are configured to provide (blue) light source light 11 to the one or more radiation input faces 111. As indicated above, they especially are configured to provide to at least one of the radiation input faces 111 a blue power $W_{opt}$ of in average at least 0.067 Watt/mm². Reference BA indicates a body axis, which will in cuboid embodiments be substantially parallel to the edge sides 147.

The elongated light transmissive body 100 comprises a ceramic material 120 configured to wavelength convert at least part of the (blue) light source light 11 into converter light 101, such as at least one or more of green and red converter light 101. As indicated above the ceramic material 120 comprises an $A_3B_5O_{12}:Ce^{3+}$ ceramic material, wherein A comprises e.g. one or more of yttrium (Y), gadolinium (Gd) and lutetium (Lu), and wherein B comprises e.g. aluminum (Al). References 20 and 21 indicate an optical filter and a reflector, respectively. The former may reduce e.g. non-green light when green light is desired or may reduce non-red light when red light is desired. The latter may be used to reflect light back into the light transmissive body or waveguide, thereby improving the efficiency. Note that more reflectors than the schematically depicted reflector may be used.

The light sources may in principle be any type of point light source, but is in an embodiment a solid state light source such as a Light Emitting Diode (LED), a Laser Diode or Organic Light Emitting Diode (OLED), a plurality of LEDs or Laser Diodes or OLEDs or an array of LEDs or Laser Diodes or OLEDs, or a combination of any of these. The LED may in principle be an LED of any color, or a combination of these, but is in an embodiment a blue light source producing light source light in the UV and/or blue color-range which is defined as a wavelength range of between 380 nm and 490 nm. In another embodiment, the light source is an UV or violet light source, i.e. emitting in a wavelength range of below 420 nm. In case of a plurality or an array of LEDs or Laser Diodes or OLEDs, the LEDs or Laser Diodes or OLEDs may in principle be LEDs or Laser Diodes or OLEDs of two or more different colors, such as, but not limited to, UV, blue, green, yellow or red.

The light sources 10 are configured to provide light source light 11, which is used as pump radiation 7. Reference 17 is used to indicate this pump radiation 7 as first pump radiation 17. The luminescent material 120 converts the light source light into luminescent material light 8. Light escaping at the light exit window is indicated as converter light 101, and will include luminescent material light 8. Note that due to reabsorption part of the luminescent material light 8 within the luminescent concentrator 5 may be reabsorbed. Hence, the spectral distribution may be redshifted relative e.g. a low doped system and/or a powder of the same material. The lighting device 1 may be used as luminescent concentrator to pump another luminescent concentrator. For this reason, the light escaping from the luminescent concentrator may also be indicated with reference 1101, i.e. the first converter light. Reference BA indicates a body axis of the elongated body.

Figure 1B:
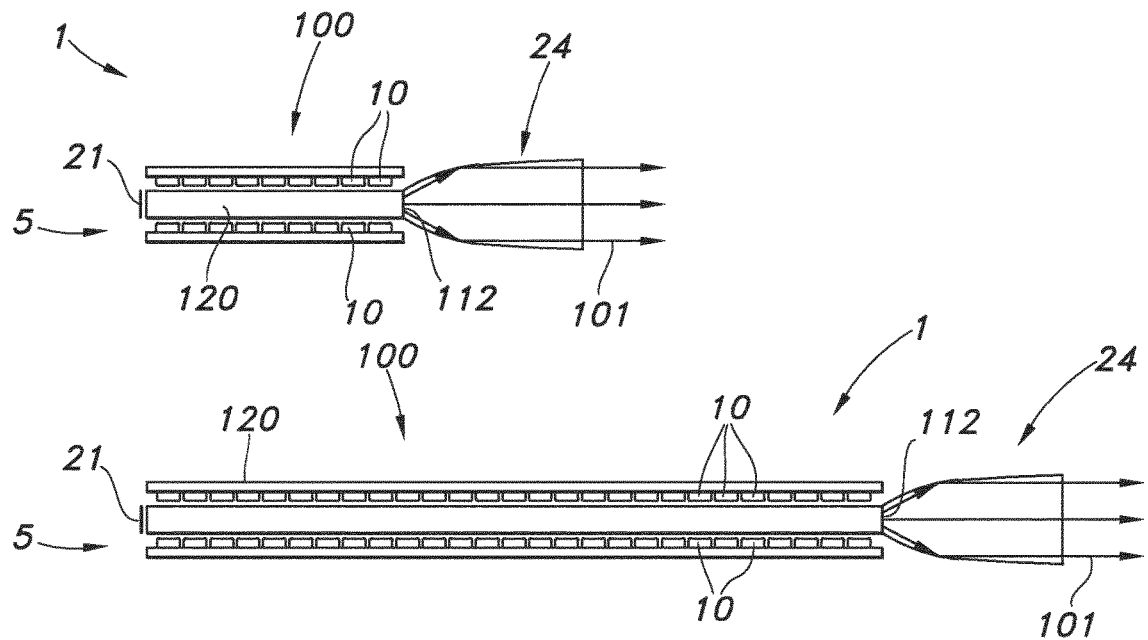

FIGS. 1a-1b schematically depict similar embodiments of the lighting device. Further, the lighting device may include further optical elements, either separate from the waveguide and/or integrated in the waveguide, like e.g. a light concentrating element, such as a compound parabolic light concentrating element (CPC). The lighting devices 1 in FIG. 1b further comprise a collimator 24, such as a CPC.

Figure 1C:
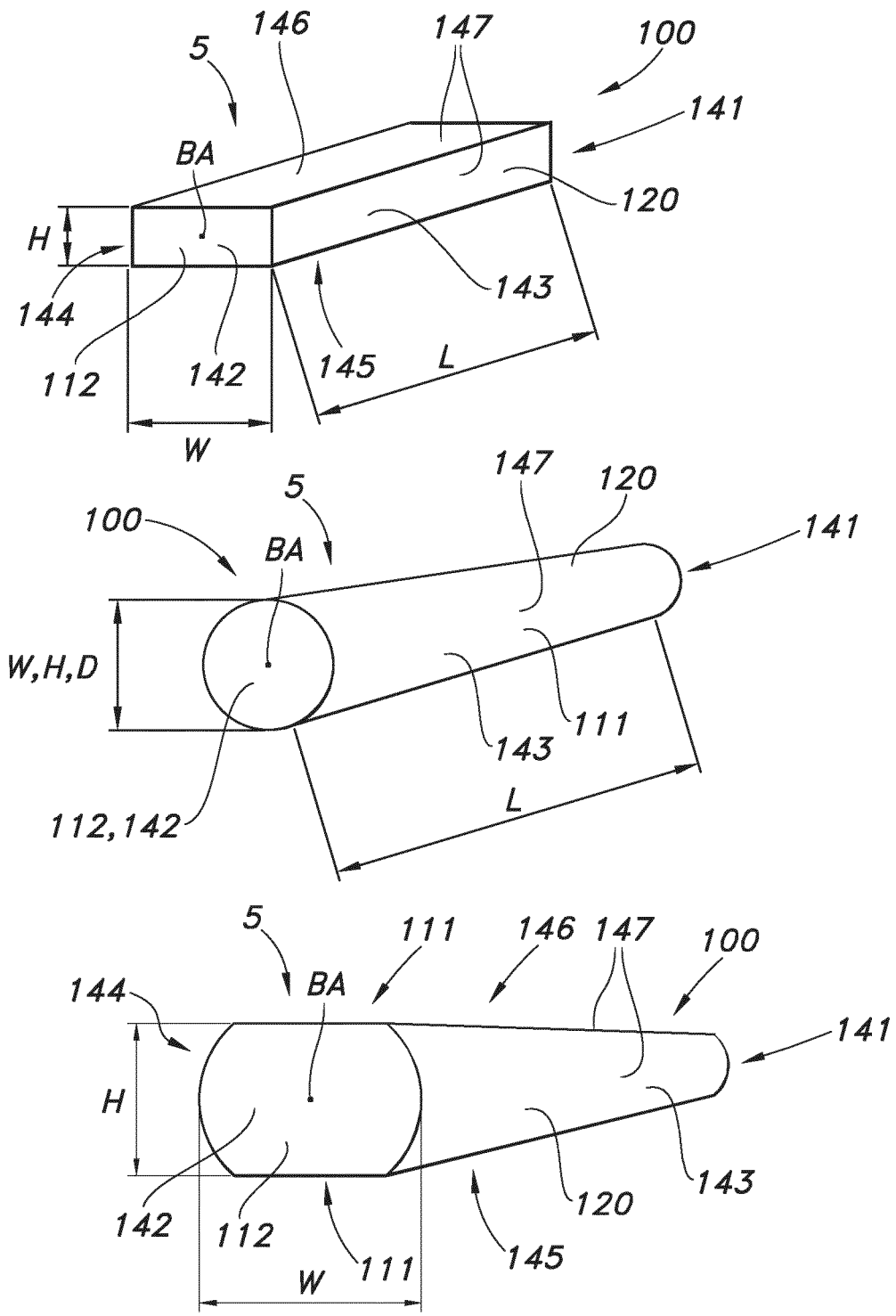

FIG. 1c schematically depicts some embodiments of possible ceramic bodies as waveguides or luminescent concentrators. The faces are indicated with references 141-146. The first variant, a plate-like or beam-like light transmissive body has the faces 141-146. Light sources, which are not shown, may be arranged at one or more of the faces 143-146 (general indicated of the edge faces is reference 147). The second variant is a tubular rod, with first and second faces 141 and 142, and a circumferential face 143. Light sources, not shown, may be arranged at one or more positions around the light transmissive body. Such light transmissive body will have a (substantially) circular or round cross-section. The third variant is substantially a combination of the two former variants, with two curved and two flat side faces. The variants shown in FIG. 1c are not limitative. More shapes are possible; i.e. for instance referred to WO2006/054203, which is incorporated herein by reference. The ceramic bodies, which are used as light guides, generally may be rod shaped or bar shaped light guides comprising a height H, a width W, and a length L extending in mutually perpendicular directions and are in embodiments transparent, or transparent and luminescent. The light is guided generally in the length L direction. The height H is in embodiments <10 mm, in other embodiments <5 mm, in yet other embodiments <2 mm. The width W is in embodiments <10 mm, in other embodiments <5 mm, in yet embodiments <2 mm. The length L is in embodiments larger than the width W and the height H, in other embodiments at least 2 times the width W or 2 times the height H, in yet other embodiments at least 3 times the width W or 3 times the height H. Hence, the aspect ratio (of length/width) is especially larger than 1, such as equal to or larger than 2, such as at least 5, like even more especially in the range of 10-100, such as 10-60, like 10-20. Unless indicated otherwise, the term "aspect ratio" refers to the ratio length/width.

The aspect ratio of the height H:width W is typically 1:1 (for e.g. general light source applications) or 1:2, 1:3 or 1:4 (for e.g. special light source applications such as headlamps) or 4:3, 16:10, 16:9 or 256:135 (for e.g. display applications). The light guides generally comprise a light input surface and a light exit surface which are not arranged in parallel planes, and in embodiments the light input surface is perpendicular to the light exit surface. In order to achieve a high brightness, concentrated, light output, the area of light exit surface may be smaller than the area of the light input surface. The light exit surface can have any shape, but is in an embodiment shaped as a square, rectangle, round, oval, triangle, pentagon, or hexagon.

Note that in all embodiments schematically depicted herein, the radiation exit window is especially configured perpendicular to the radiation input face(s). Hence, in embodiments the radiation exit window and radiation input face(s) are configured perpendicular. In yet other embodiments, the radiation exit window may be configured relative to one or more radiation input faces with an angle smaller or larger than 90°.

Figure 1D:
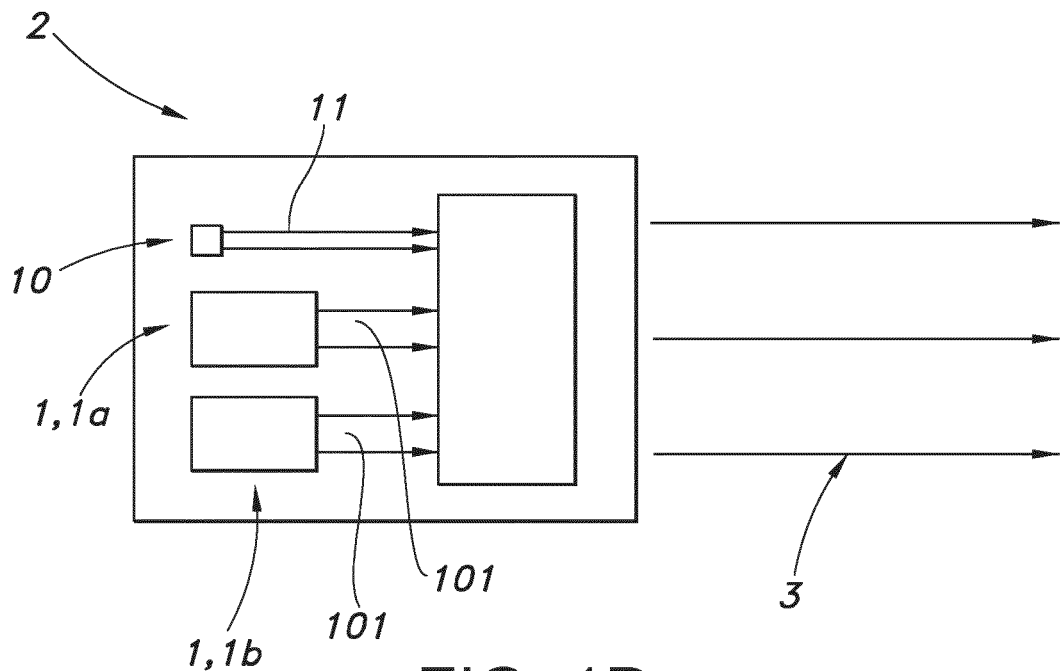

FIG. 1d very schematically depicts a projector or projector device 2 comprising the lighting device 1 as defined herein. By way of example, here the projector 2 comprises at least two lighting devices 1, wherein a first lighting device (1a) is configured to provide e.g. green light 101 and wherein a second lighting device (1b) is configured to provide e.g. red light 101. Light source 10 is e.g. configured to provide blue light. These light sources may be used to provide the projection 3. Note that the additional light source 10, configured to provide light source light 11, is not necessarily the same light source as used for pumping the luminescent concentrator(s). Further, here the term "light source" may also refer to a plurality of different light sources.

High brightness light sources are interesting for various applications including spots, stage-lighting, headlamps and digital light projection.

Figure 2A:
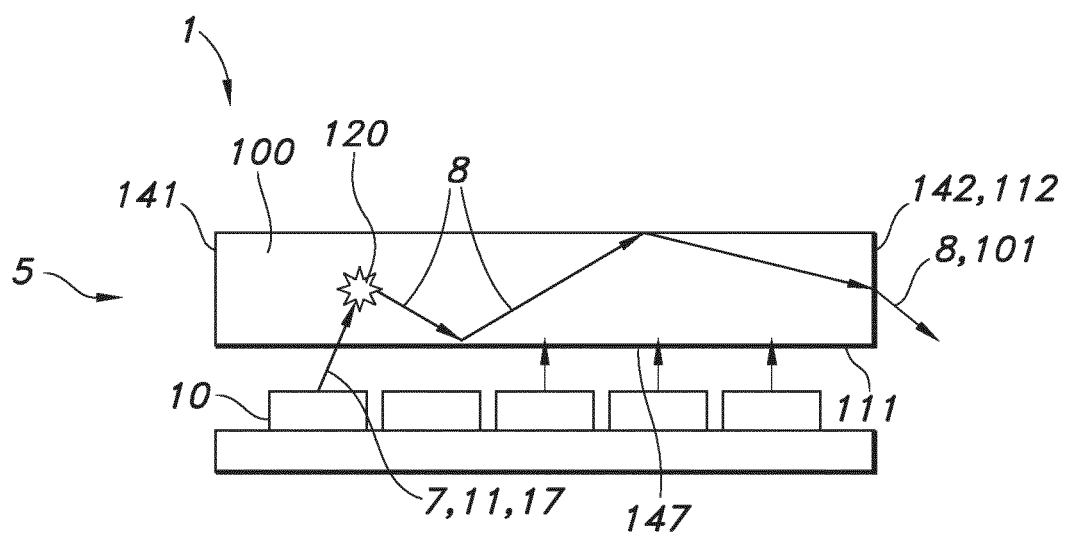
FIGS. 2a-2k schematically depict some aspects of the invention.

For this purpose, it is possible to make use of so-called light concentrators where shorter wavelength light is converted to longer wavelengths in a highly transparent luminescent material. A rod of such a transparent luminescent material can be used and then it is illuminated by LEDs to produce longer wavelengths within the rod. Converted light which will stay in the luminescent material such as a doped garnet in the waveguide mode and can then be extracted from one of the surfaces leading to an intensity gain (FIG. 2a).

One of the problems of this concept is related to the intensity of the LEDs used for pumping the luminescent waveguide. For this purpose, longer waveguides with more LEDs can be used. However, this makes the rod quite long and difficult to produce. This makes scalability for obtaining higher intensities rather difficult.

Figure 2B:
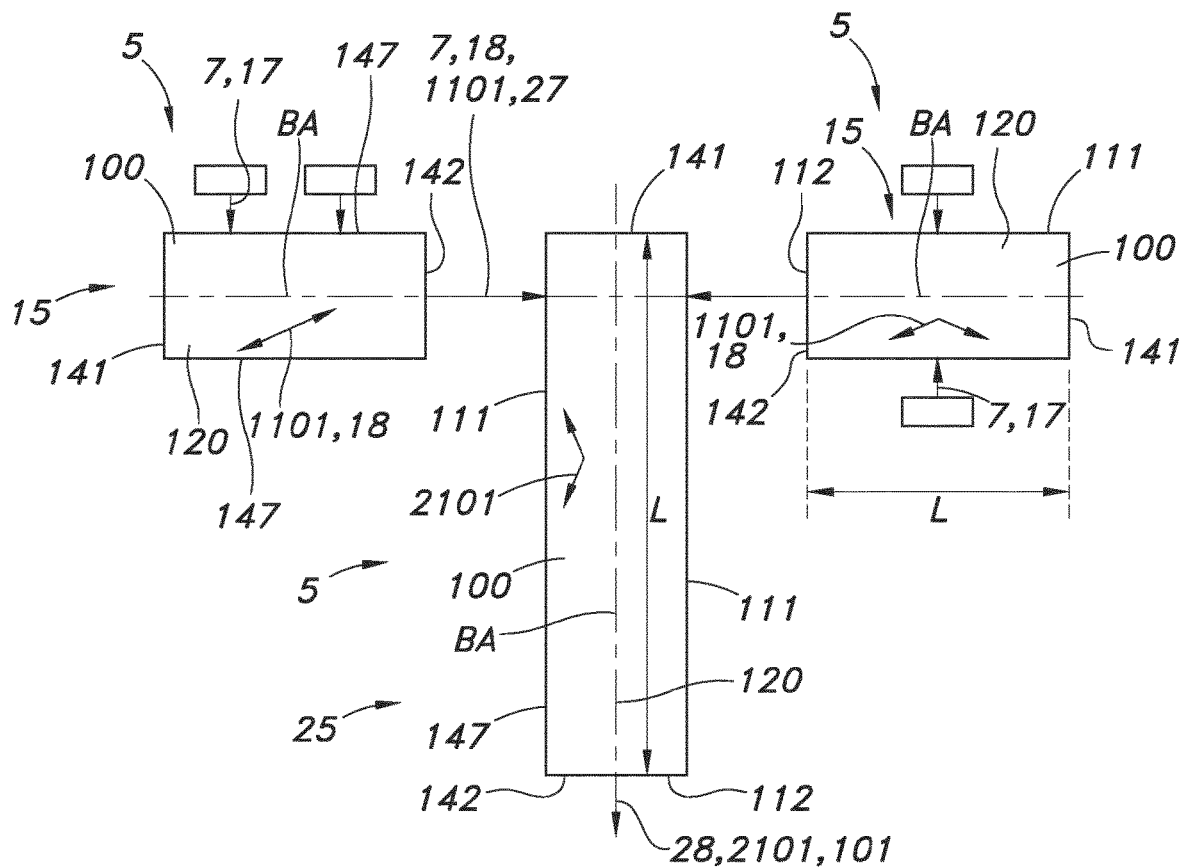

FIG. 2b schematically depicts an embodiment of the lighting device 1 as described herein. The lighting device 1 comprises a plurality of luminescent concentrators 5, each luminescent concentrator 5 comprising an elongated light transmissive body 100 having a first face 141 and a second face 142 defining a length L of the elongated body 100, the elongated body 100 comprising one or more radiation input faces 111 and a radiation exit window 112, wherein the second face 142 comprises said radiation exit window 112. Each elongated light transmissive body 100 comprises a luminescent material 120 configured to convert at least part of a pump radiation 7 received at one or more radiation input faces 111 into luminescent material light 8, and each luminescent concentrator 5 configured to couple at least part of the luminescent material light 8 out at the radiation exit window 112 as converter light 101.

This device 1 comprises a plurality of luminescent concentrators 5, such as first luminescent concentrators 15 and a second luminescent concentrator 25.

The device 1 comprises a plurality of light sources 10 configured to provide light source light 11 as first pump radiation 17 to the radiation input faces 111 of a plurality of first luminescent concentrators 15. Further, the plurality of first luminescent concentrators 15 are configured to provide first luminescent material light 18 at the respective radiation exit windows 112 of the first luminescent concentrators 15 as first converter light 1101. Yet further, the plurality of first luminescent concentrators 15 are configured to provide said first converter light 1101 as second pump radiation 27 to one or more radiation input faces 111 of a second luminescent concentrator 25. The second luminescent concentrator 25 is configured to provide second luminescent material light 28 at the radiation exit window 112 of the second luminescent concentrator 25 as second converter light 2101.

Hence, here we suggest using multiple primary transparent luminescent light guides pumped with LEDs for pumping a secondary single transparent luminescent light guide from its sides for getting high light intensity from its light exit surface. For a further possible embodiment schematically depicted, see FIG. 2c. With the multiple pumping luminescent rod configuration ultra-high brightness may be obtained.

Figure 2C:
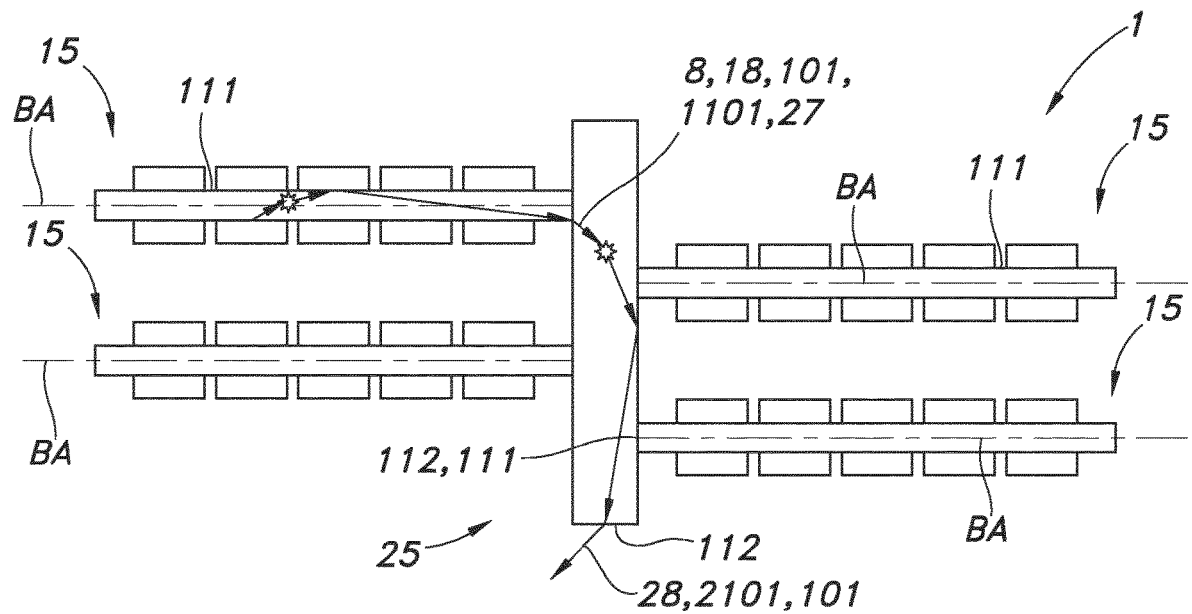

Note that the body axis BA of the first luminescent concentrators 15 in these embodiments of FIGS. 2b-2c, and some other embodiments, are aligned parallel. Further, that the body axis BA of the first luminescent concentrators 15 in this embodiment are aligned perpendicular to the body axis BA of the second luminescent concentrator. However, the respective body axis may be arranged in planes that coincide, or are at least configured parallel.

The absorption and emission wavelength from the primary transparent light guides need to be lower than that of the secondary transparent luminescent light guide. In this ID various configurations will be described.

For example, the following components can be used for obtaining high intense yellow light:

LEDs: Blue LEDs emitting blue light e.g. 460 nm;

primary transparent luminescent light guide: absorbing blue light and emitting green light e.g. 520 nm (e.g. Ce doped LuAG);

secondary transparent luminescent light guide: absorbing green light and emitting yellow light e.g. 560 nm (e.g. quantum dots).

In another example, the following components can be used for obtaining high intense red light:

LEDs: Blue LEDs emitting blue light e.g. 460 nm;

primary transparent luminescent light guide: absorbing blue light and emitting yellow light e.g. 550 nm (e.g. Ce doped LuAG);

secondary transparent luminescent light guide: absorbing yellow light and emitting red light e.g. 620 nm (e.g. quantum dots).

In yet another example, the following components can be used for obtaining high intense green light:

LEDs: UV LEDs emitting UV light e.g. 390 nm;

primary transparent luminescent light guide: absorbing UV light and emitting blue light e.g. 440 nm (e.g. $Eu^{2+}$ doped $BaMgAl_{10}O_{17}$ and/or $Eu^{2+}$ doped $Sr_5(PO_4)_3Cl$);

secondary transparent luminescent light guide: absorbing blue light and emitting green light e.g. 520 nm (e.g. Ce doped LuAG YAG for yellow green emission).

Preferably the Stokes shifts of the primary and secondary transparent luminescent light guides is rather small for optimizing thermal management of the system.

Figure 2D:
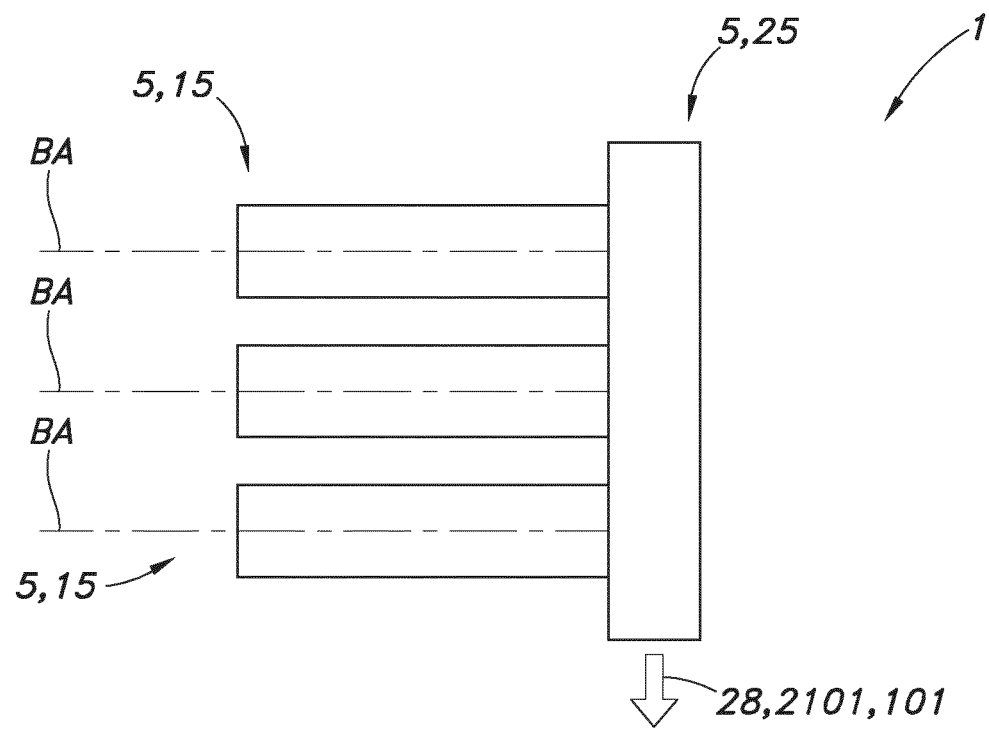

In an embodiment, the primary transparent light guides are positioned at one side (FIG. 2d). Note that the LEDs are not shown in the schematic illustration.

Figure 2E:
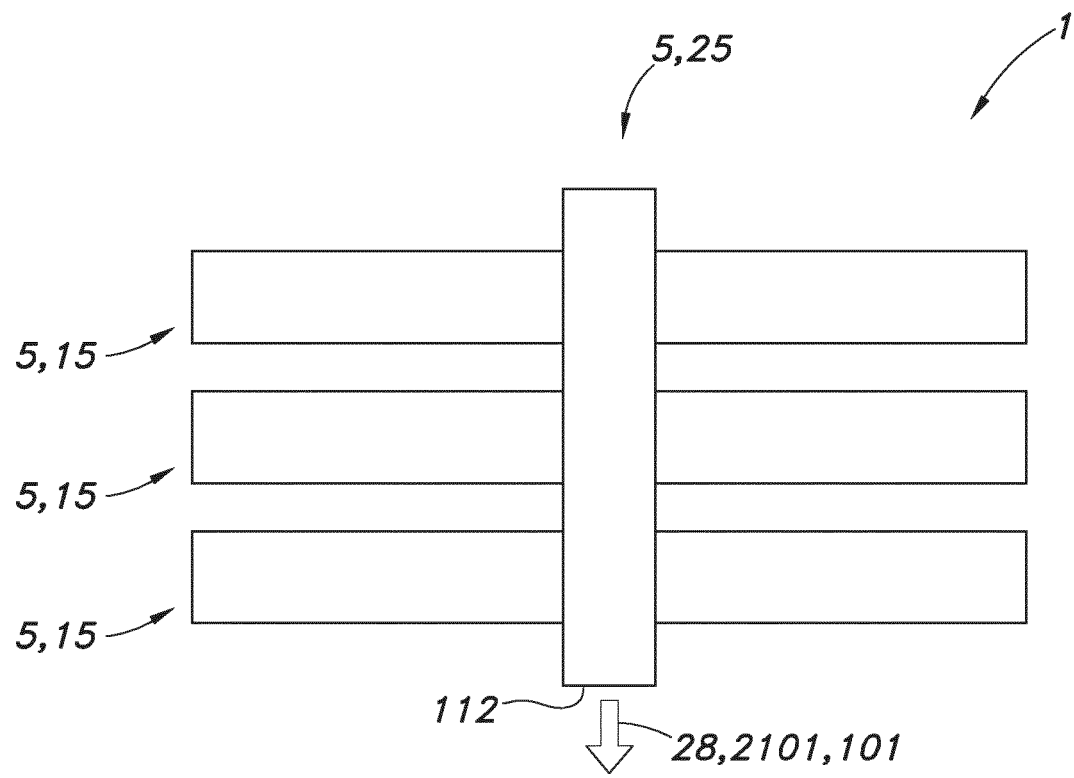

In another embodiment, the primary transparent light guides are positioned at two sides (FIG. 2e).

Figure 2F:
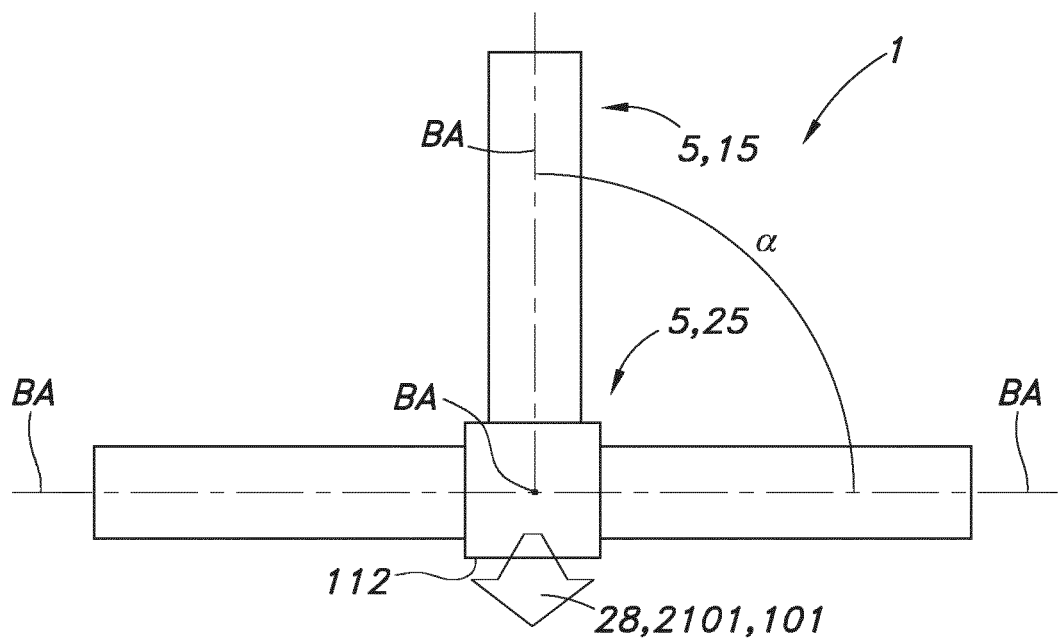

In another embodiment, the primary transparent light guides are positioned at three sides (FIG. 2f). Note that the schematic illustration shows the front view of the lighting device.

Further note that heat sinking not is not shown in the drawing or in the other schematic drawings.

Figure 2G:
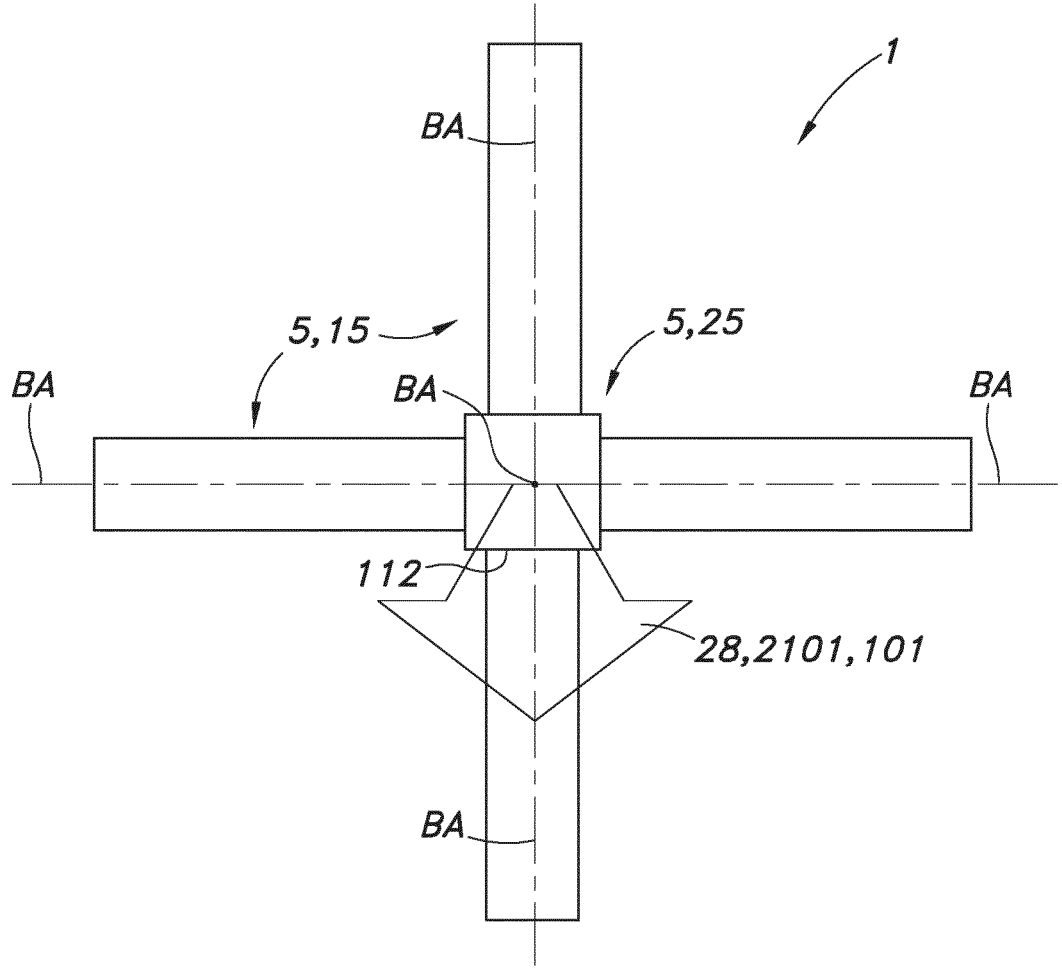

In another embodiment, the primary transparent light guides are positioned at four sides (FIG. 2g). Note that the schematic illustration shows the front view of the lighting device.

Note that the body axis BA of the first luminescent concentrators 15 in these embodiments of FIGS. 2f-2g, and some other embodiments, are aligned under an angle α (here α is substantially 90°). Further, that the body axis BA of the first luminescent concentrators 15 in this embodiment are aligned perpendicular to the body axis BA of the second luminescent concentrator. In these schematic drawings only three or four first luminescent concentrators 15 are schematically depicted. Would there be more, of which a subset may be arranged in a row, then within the subset the body axes may be configured parallel.

The cross-section of the transparent luminescent rods can have any shape such as a square, rectangle, hexagonal, round, etc.

Figure 2H:
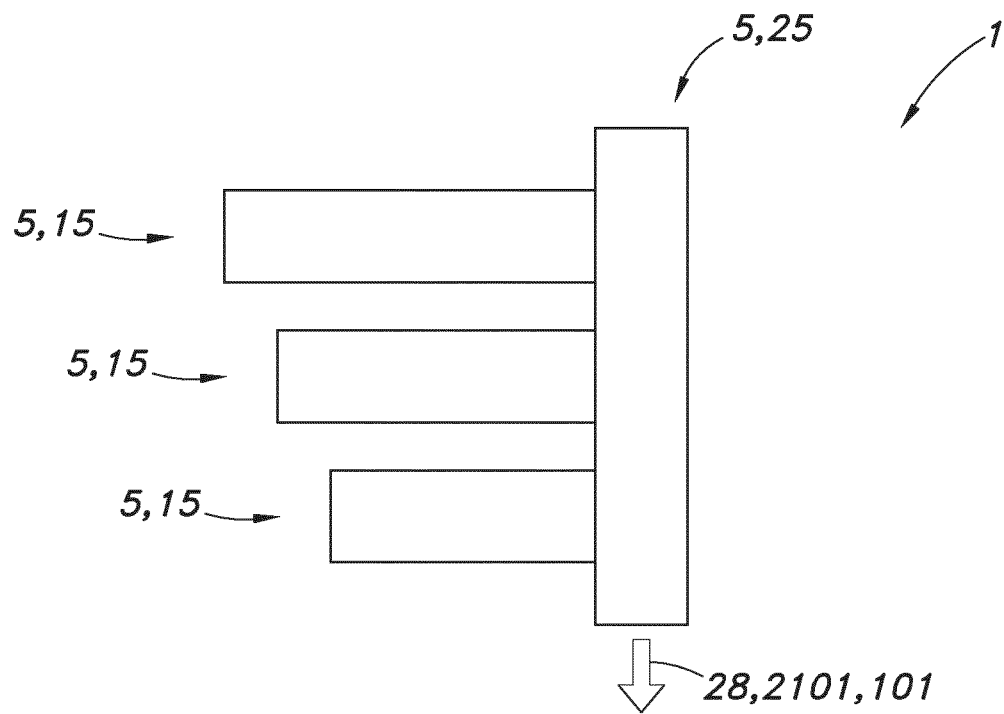

The shape or length of the primary transparent luminescent light guides might be different (from the secondary transparent luminescent light guide) (FIG. 2h).

Figure 2I:
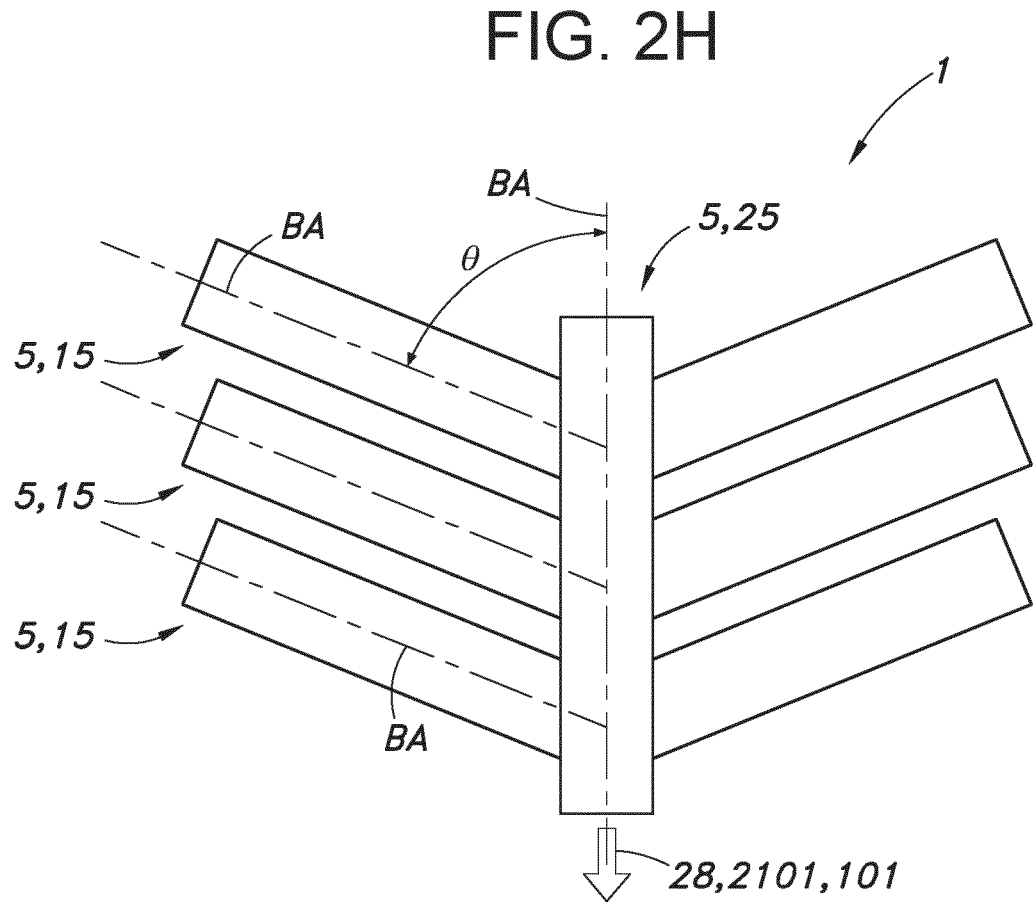

The primary transparent luminescent light guides might be positioned under an angle different than 90° with respect to the secondary transparent luminescent light guide, see FIG. 2i). The angle (between the body axes BA of the first luminescent concentrators 15 and the body axis BA of the second luminescent concentrator 25) is indicated with reference θ. Note that FIG. 2i schematically depicts an embodiment with two subsets of first luminescent concentrators 15, which all may have the body axes BA in the same plane, and wherein within a subset the body axes BA may be aligned parallel.

Figure 2J:
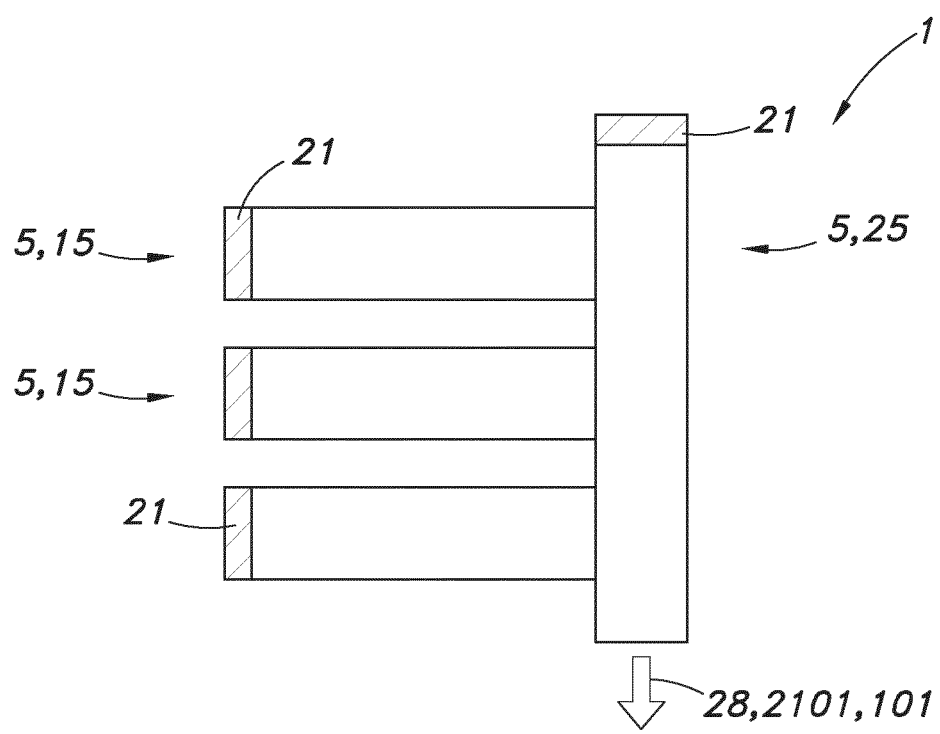

In a preferred embodiment, the transparent luminescent rods comprises reflectors at one of the possible light exits (FIG. 2j). However, other configurations of reflectors may also be possible.

Figure 2K:
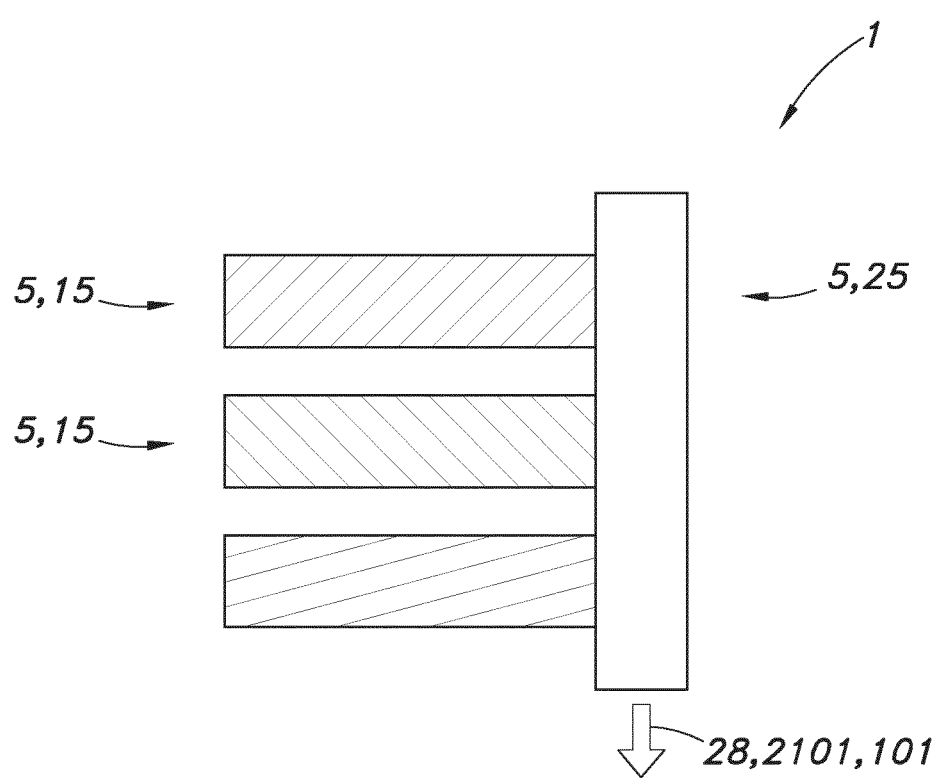

Different primary transparent luminescent light guides might be combined (FIG. 2k). For instance, UV and blue, or UV with different peak maxima or blue with different peak maxima, etc.

Figure 3A:
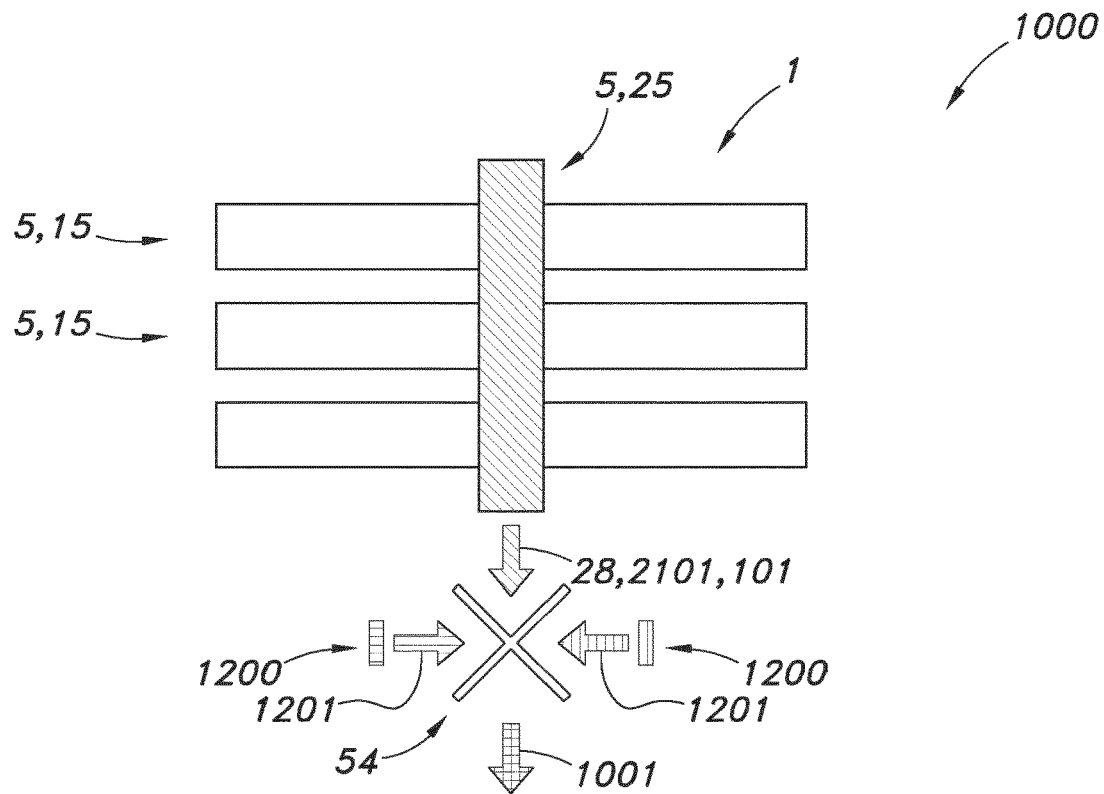
FIGS. 3a-3e schematically depict some aspects of the invention.

The herein suggested lighting device might be combined with other light sources for e.g. obtaining white light (FIG. 3a). This drawings shows an embodiment of a lighting system 1000 configured to provide lighting system light 1001. The lighting system comprises one or more lighting devices 1 as defined herein and optionally one or more second lighting devices 1200 configured to provide second lighting device light 1201 (here two second lighting devices 1200 are schematically depicted, e.g. configured to provide red and blue light, respectively. The lighting system light 1001 comprises (a) one or more of (i) said second converter light 2101 and (ii) said third converter light 3101 (not depicted, but this would apply when the lighting system 1000 would include a lighting device 1 as e.g. schematically depicted in FIG. 3c or 4d, and optionally (b) second lighting device light 1201. Reference 54 refers to optics, especially to combine the different types of light. For instance, one or more dichroic mirrors may be applied, as schematically depicted.

Figure 3B:
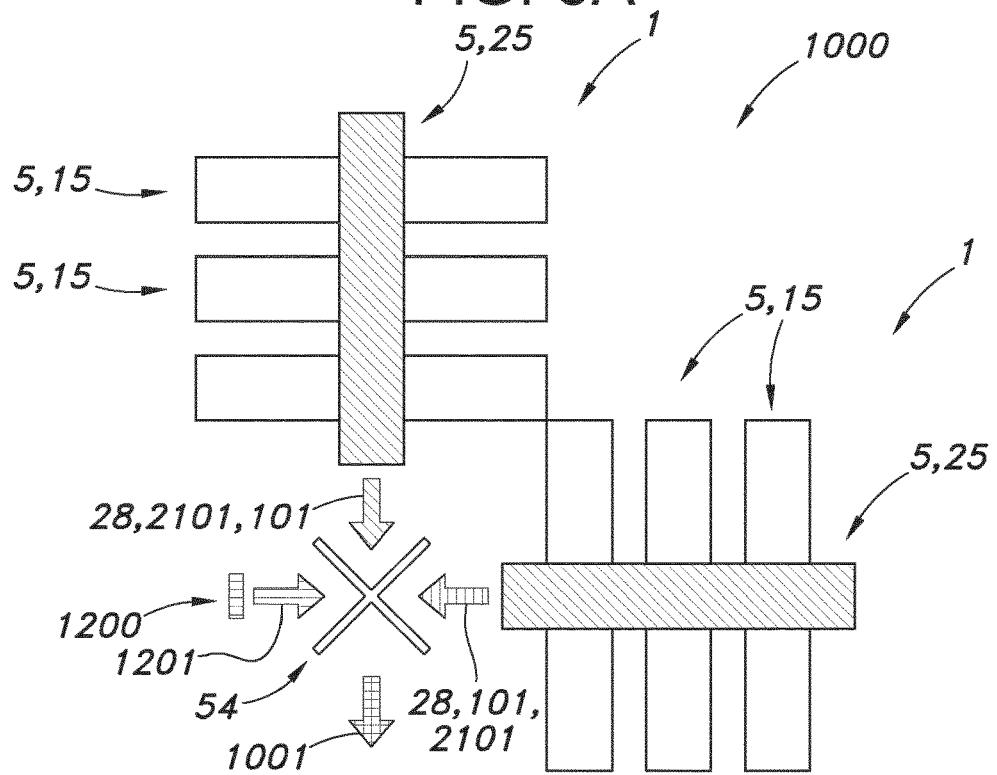

Several lighting devices might be combined for e.g. obtaining white light (FIG. 3b), optionally in combination with a second lighting device 1200.

Figure 3C:
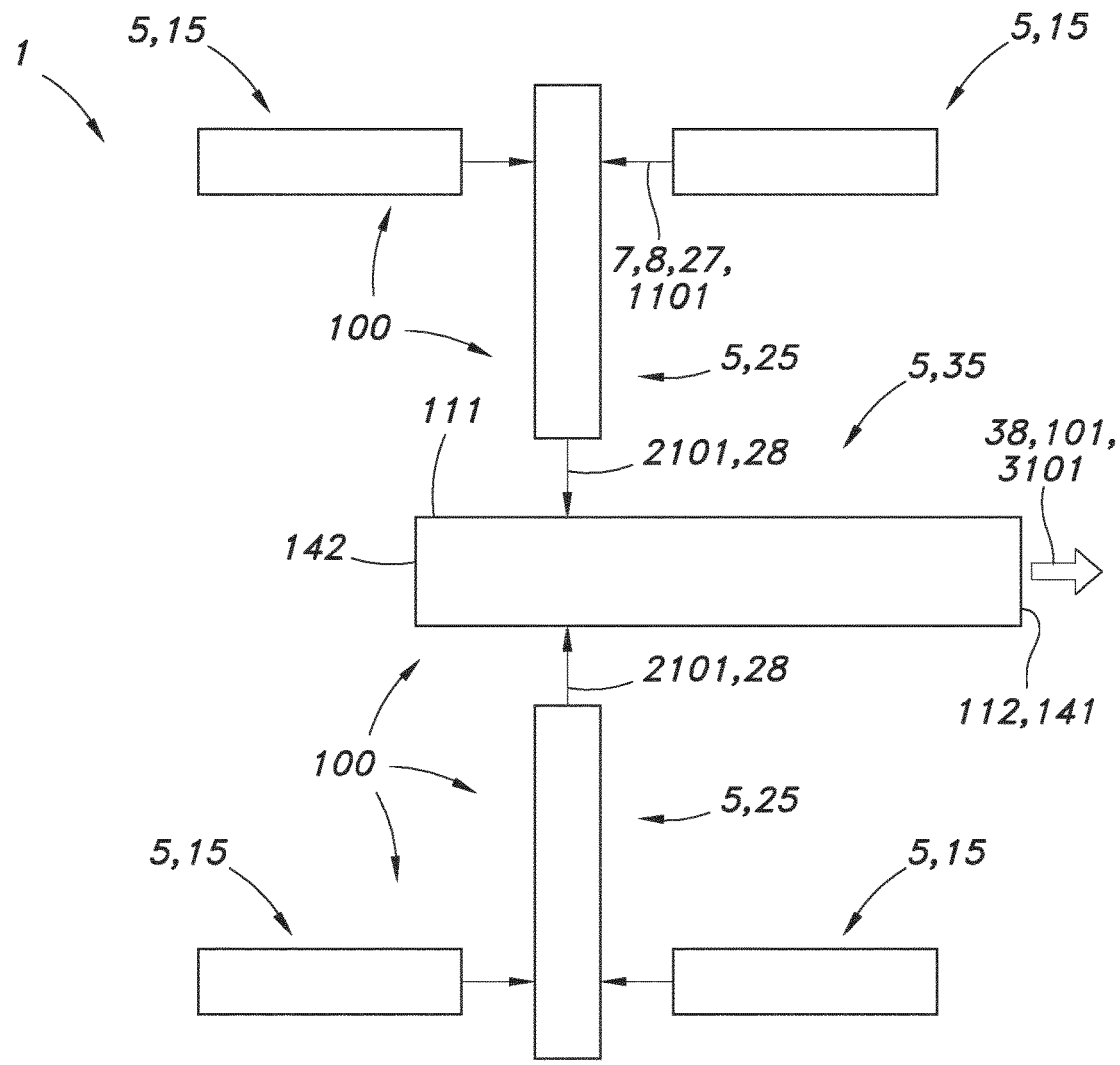
Figure 3D:
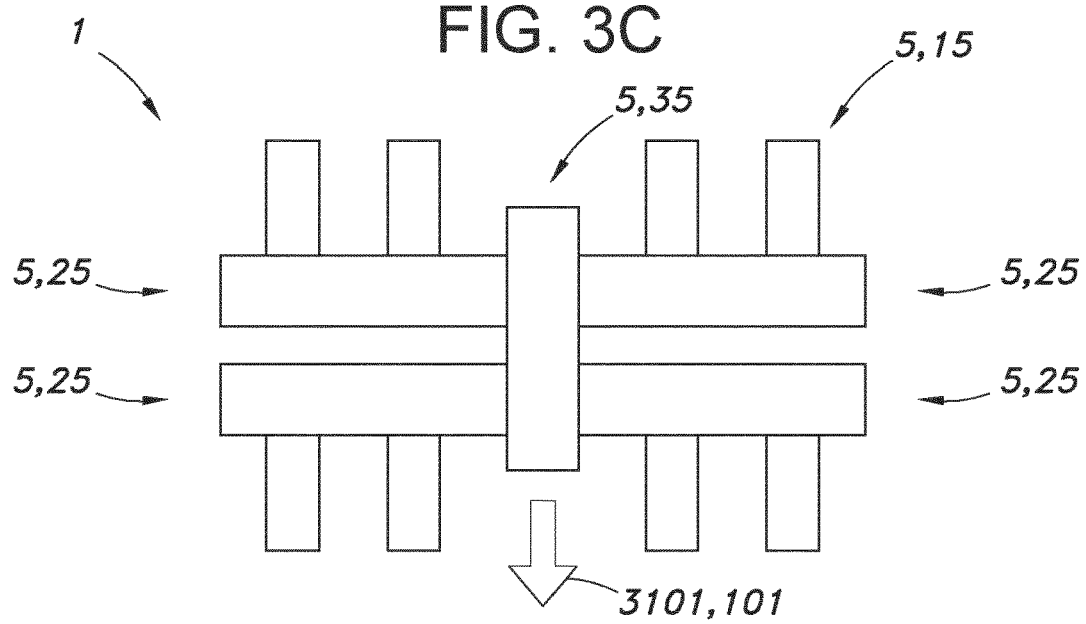

In another embodiment, we suggest a lighting device comprising primary, secondary and tertiary transparent luminescent light guides (FIGS. 3c-3d). FIG. 3c schematically depicts an embodiment of the lighting device 1 as defined herein, wherein the plurality of first luminescent concentrators 15 are configured to provide said first converter light 1101 as second pump radiation 27 to one or more radiation input faces 111 of a plurality of second luminescent concentrator 25. Further, the second luminescent concentrators 25 are configured to provide second luminescent material light 28 at the radiation exit windows 112 of the second luminescent concentrators 25 as second converter light 2101. The second luminescent concentrators 25 are also configured to provide said second converter light 2101 as third pump radiation 37 to one or more radiation input faces 111 of a third second luminescent concentrator 35. The third luminescent concentrator 35 is further configured to provide third luminescent material light 38 at the radiation exit window 112 of the third luminescent concentrator 35 as third converter light 3101. FIG. 3d schematically depicts a further configuration. FIGS. 3c-3d schematically depict embodiments with concentrator-concentrator-concentration functional coupling; a number of the other schematically depicted embodiments in general relate to concentrator-concentration functional coupling.

Figure 3E:
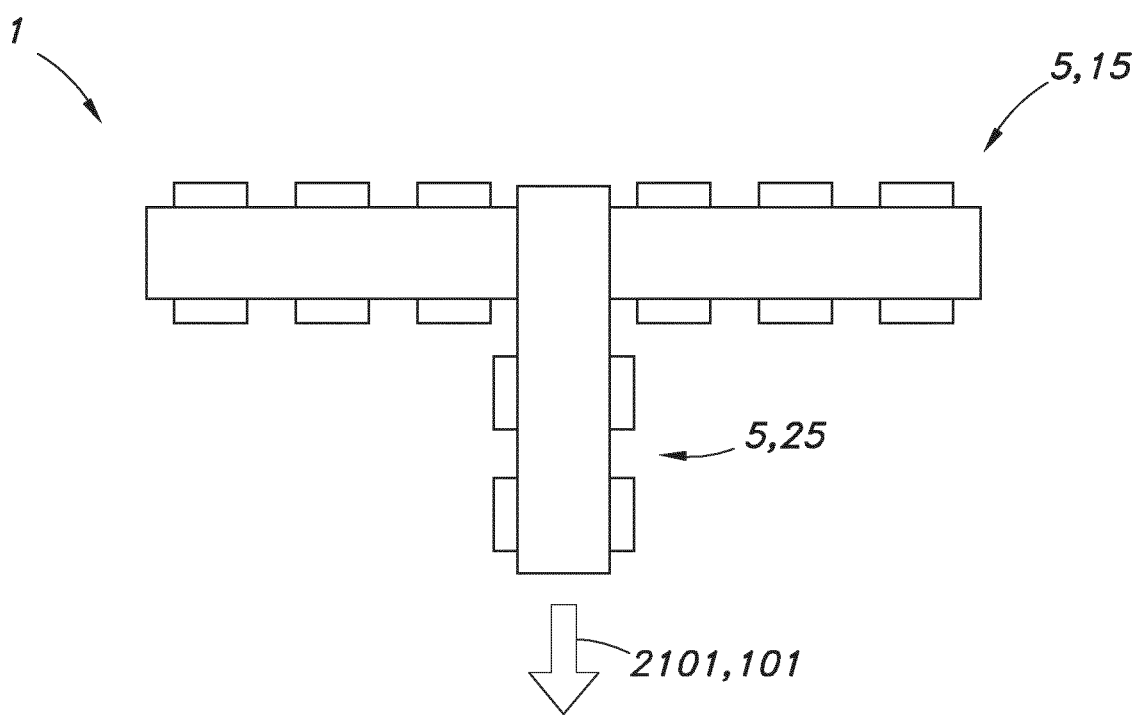

In yet another embodiment, we suggest a lighting device comprising primary and secondary transparent luminescent light guides wherein the secondary light guide is pumped by light of the first transparent luminescent light guide and additional LEDs (FIG. 3e). This embodiment may be used for both the embodiments with the second luminescent concentrators (without third luminescent concentrators) as well with embodiments with also one or more third luminescent concentrators.

The light source used herein is preferably a solid state light emitter. Examples of solid state light emitters are Light Emitting Diodes (LEDs), Organic Light Emitting diode(s) OLEDs, or, for example, laser diodes. Solid state light emitters are relatively cost effect light sources because they are, in general, not expensive, have a relatively large efficiency and a long life-time. The light source is preferably a UV, Violet or Blue light source.

Applications include but are not limited to projectors, lamps, luminaires, or other lighting systems such as shop lighting systems, home lighting systems, accent lighting systems, spot lighting systems, theater lighting systems, fiber-optics application systems, projection systems, display systems, warning sign systems, medical lighting application systems, indicator sign systems, and decorative lighting systems, portable systems and automotive applications.

The term "substantially" herein, such as in "substantially all light" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of". The term "and/or" especially relates to one or more of the items mentioned before and after "and/or". For instance, a phrase "item 1 and/or item 2" and similar phrases may relate to one or more of item 1 and item 2. The term "comprising" may in an embodiment refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to a device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. A lighting device comprising:
   a plurality of luminescent concentrators, each luminescent concentrator comprising an elongated light transmissive body having a first face and a second face wherein the distance between the first face and the second face defines a length of the elongated body, the elongated body comprising one or more radiation input faces extending between the first face and the second face, each luminescent concentrator comprising a radiation exit window, wherein the second face comprises said radiation exit window; each elongated light transmissive body comprising a luminescent material configured to convert at least part of a pump radiation received at one or more radiation input faces into luminescent material light, and each luminescent concentrator configured to couple at least part of the respective luminescent material light out at the radiation exit window as converted light,
   a plurality of light sources configured to provide light source light as first pump radiation to the radiation input faces of a plurality of first luminescent concentrators;
   wherein said plurality of luminescent concentrators comprises a first plurality of luminescent concentrators and a second plurality of luminescent concentrators, the first plurality of luminescent concentrators are configured to provide first luminescent material light at the respective radiation exit windows of the first luminescent concentrators as first converted light, and said first plurality of luminescent concentrators are further configured to provide said first converted light as second pump radiation to one or more radiation input faces of a second luminescent concentrator; and
   wherein said second plurality of luminescent concentrator are configured to provide second luminescent material light at the radiation exit window of the second luminescent concentrator as second converted light.

2. The lighting device according to claim 1, wherein each one of the elongated light transmissive body comprises a geometrical concentration factor of at least 2, wherein the geometrical concentration factor is defined as the ratio of the area of the radiation input faces and the area of the radiation exit window, and wherein the lighting device further comprising a collimator configured downstream of the radiation exit window and configured to collimate the converted light.

3. The lighting device according to claim 1, wherein the length is at least 20 mm, and wherein the plurality of light sources are configured to provide to at least one of the radiation input faces a photon flux of at least $1.0*10^{17}$ photons.

4. The lighting device according to claim 1, wherein the plurality of first luminescent concentrators are configured to provide said first converted light as second pump radiation to two or more radiation input faces of the second luminescent concentrator.

5. The lighting device according to claim 1, wherein the first plurality of luminescent concentrators includes at least two subsets of first luminescent concentrators having different lengths.

6. The lighting device according to claim 1, wherein the length is selected from the range of 10-500 mm.

7. The lighting device according to claim 1, wherein each luminescent concentrator comprises a body axis, wherein the first plurality of luminescent concentrators further includes two or more subsets of first luminescent concentrators configured with an angle of the body axis of the first luminescent concentrator and the body axis of the second luminescent concentrator unequal to 90°.

8. The lighting device according to claim 1, wherein the elongated light transmissive body of one or more luminescent concentrators comprise an elongated ceramic body.

9. The lighting device according to claim 1, wherein the plurality of light sources are configured to provide UV radiation as first pump radiation, and wherein the first plurality of luminescent concentrators are further configured to provide one or more of blue and green first converted light.

10. The lighting device according to claim 1, wherein the plurality of light sources are configured to provide blue radiation as first pump radiation, and wherein the first luminescent concentrators are configured to provide one or more of green and yellow first converted light.

11. The lighting device according to claim 1, wherein the second luminescent concentrator is configured to provide one or more of yellow, orange and red second converted light.

12. The lighting device according to claim 1, wherein
   said plurality of first luminescent concentrators are configured to provide said first converted light as second pump radiation to one or more radiation input faces of a plurality of second luminescent concentrator; and
   said second luminescent concentrators are configured to provide second luminescent material light at the radiation exit windows of the second luminescent concentrators as second converted light, and configured to provide said second converted light as third pump radiation to one or more radiation input faces of a third second luminescent concentrator; and
   said third luminescent concentrator, configured to provide third luminescent material light at the radiation exit window of the third luminescent concentrator as third converted light.

13. The lighting device according to claim 12, wherein the third luminescent concentrator is configured to provide one or more of yellow, orange and red third converted light.

14. A lighting system configured to provide lighting system light, the lighting system comprising one or more lighting devices according to claim 1 and optionally one or more second lighting devices configured to provide second lighting device light, wherein the lighting system light comprises one or more of said second converted light.

* * * * *